(12) United States Patent
Shekhter et al.

(10) Patent No.: US 6,558,447 B1
(45) Date of Patent: May 6, 2003

(54) METAL POWDERS PRODUCED BY THE REDUCTION OF THE OXIDES WITH GASEOUS MAGNESIUM

(75) Inventors: Leonid N. Shekhter, Newton, MA (US); Terrance B. Tripp, Westboro, MA (US); Leonid L. Lanin, Belmont, MA (US); Karlheinz Reichert, Wolfenbuttel (DE); Oliver Thomas, Bad Harzburg (DE); Joachim Vieregge, Goslar (DE)

(73) Assignee: H.C. Starck, Inc., Newton, MA (US)

( * ) Notice: Subject to any disclaimer, the term of this patent is extended or adjusted under 35 U.S.C. 154(b) by 0 days.

(21) Appl. No.: 09/445,331

(22) PCT Filed: May 5, 1999

(86) PCT No.: PCT/US99/09772

§ 371 (c)(1),
(2), (4) Date: Apr. 9, 2001

(87) PCT Pub. No.: WO00/67936

PCT Pub. Date: Nov. 16, 2000

(51) Int. Cl.⁷ .............................. B22F 1/00; B22F 3/00

(52) U.S. Cl. ............................ 75/252; 75/352; 75/369; 75/245

(58) Field of Search ..................... 75/252, 245, 352, 75/369

(56) References Cited

U.S. PATENT DOCUMENTS

| | | | |
|---|---|---|---|
| 1,602,542 A | * 10/1926 | Marden | |
| 1,728,941 A | * 9/1929 | Marden et al. | |
| 2,287,771 A | * 6/1942 | Alexander | |
| 2,516,863 A | * 8/1950 | Gardner | |
| 2,881,067 A | * 4/1959 | Hivert et al. | |
| 3,658,507 A | * 4/1972 | Gohin et al. | |
| 4,084,965 A | * 4/1978 | Fry | 75/230 |
| 4,722,756 A | * 2/1988 | Hard | |
| 4,740,238 A | * 4/1988 | Schiele | 75/0.5 BB |
| 5,242,481 A | * 9/1993 | Kumar | 75/364 |
| 5,261,942 A | * 11/1993 | Fife et al. | 75/342 |
| 5,448,447 A | * 9/1995 | Chang | 361/529 |
| 5,605,561 A | * 2/1997 | Iwabuchi et al. | 75/364 |
| 6,171,363 B1 | * 1/2001 | Shekhter et al. | 75/369 |

FOREIGN PATENT DOCUMENTS

WO    WO 98/19811    5/1998

\* cited by examiner

*Primary Examiner*—Ngoclan Mai
(74) *Attorney, Agent, or Firm*—Godfried R. Akorli; Diderico van Eyl

(57) ABSTRACT

Metal powder Ta and/or Nb, with or without one or metals from the group Ta, Nb, Ti, Mo, W, V, Zr and Hf, is made in a fine powder form by reduction of metal oxide by contact with a gaseous reducing agent, preferably an alkaline earth metal, to near complete reduction, leaching, further deoxidation and agglomeration, the powder so produced being sinterable to capacitor anode form and processable to other usages.

66 Claims, 16 Drawing Sheets

METAL POWDERS PRODUCED BY THE REDUCTION OF THE OXIDES WITH GASEOUS MAGNESIUM

This application is the national U.S. phase patent application of PCT/US99/09772, filed May 5, 1999, which claims priority to U.S. Ser. No. 09/073,448 filed May 6, 1998, now U.S. Pat. No. 6,171,363-B1, granted Jan. 9, 2001, and DE 198 31 280.6, filed on Jul. 13, 1998.

FIELD AND BACKGROUND OF THE INVENTION

This invention relates to the production of tantalum, niobium and other metal powders and their alloys by the reduction of the corresponding metal oxide with gaseous active metals such as Mg, Ca and other elemental and compound reducing materials, in gaseous form.

Tantalum and niobium are members of a group of metals that are difficult to isolate in the free state because of the stability of their compounds, especially some of their oxides. A review of the methods developed to produce tantalum will serve to illustrate the history of a typical manufacturing process for these metals. Tantalum metal powder was first produced on a commercial scale in Germany at the beginning of the $20^{th}$ Century by the reduction of the double salt, potassium heptafluorotantalate ($K_2TaF_7$) with sodium. Small pieces of sodium were mixed with the tantalum containing salt and sealed into a steel tube. The tube was heated at the top with a ring burner and, after ignition, the reduction proceeded quickly down the tube. The reaction mixture was allowed to cool and the solid mass, consisting of tantalum metal powder, unreacted $K_2TaF_7$ and sodium, and other products of the reduction was removed by hand using a chisel. The mixture was crushed and then leached with dilute acid to separate the tantalum from the components. The process was difficult to control, dangerous, and produced a coarse, contaminated powder, but nevertheless pointed the way to what became the principal means of production of high purity tantalum in later years.

Commercial production of tantalum metal in the United States began in the 1930's. A molten mixture of $K_2TaF_7$ containing tantalum oxide ($Ta_2O_5$) was electrolyzed at 700° C. in a steel retort. When the reduction was completed, the system was cooled and the solid mass removed from the electrolysis cell, and then crushed and leached to separate the coarse tantalum powder from the other reaction products. The dendritic powder was not suitable for use directly in capacitor applications.

The modern method for manufacturing tantalum was developed in the late 1950's by Hellier and Martin (Hellier, E. G. and Martin, G. L., U.S. Pat. No. 2,950,185, 1960). Following Hellier and Martin, and hundreds of subsequently described implementations or variations, a molten mixture of $K_2TaF_7$ and a diluent salt, typically NaCl, is reduced with molten sodium in a stirred reactor. Using this system, control of the important reaction variables, such as reduction temperature, reaction rate, and reaction composition, was feasible. Over the years, the process was refined and perfected to the point where high quality powders with surface area exceeding 20,000 $cm^2/gm$ are produced and materials with surface area in the 5000–8000 $cm^2/gm$ range being typical. The manufacturing process still requires the removal of the solid reaction products from the retort, separation of the tantalum powder from the salts by leaching, and treatments like agglomeration to improve the physical properties. Most capacitor grade tantalum powders are also deoxidized with magnesium to minimize the oxygen content (Albrecht, W. W., Hoppe, H., Papp, V. and Wolf, R., U.S. Pat. No. 4,537,641, 1985). Artifacts of preagglomeration of primary particles to secondary particle form and doping with materials to enhance capacitance (e.g. P, N, Si, and C) are also known today.

While the reduction of $K_2TaF_7$ with sodium has allowed the industry to make high performance, high quality tantalum powders thus, according to Ullmann's Encyclopedia of Industrial Chemistry, $5^{th}$ Edition, Volume A 26, p. 80, 1993, the consumption of tantalum for capacitors had already reached a level of more than 50% of the world production of tantalum of about 1000 tons per annum, whereas there had essentially been no use of niobium for capacitors, even through the raw material base for niobium is considerably broader than that for tantalum and most of the publications on powder preparation and capacitor manufacturing methods mention niobium as well as tantalum.

Some of the difficulties of applying that process to niobium are as follows:

While the manufacturing process of the type shown in Hellier and Martin (U.S. Pat. No. 2,950,185) for the reduction of potassium heptaflorotantalate by means of sodium in a salt melt is available in principle for the production of high purity niobium powders via potassium heptafluoroniobate, it doesn't work well in practice. This is due, in part, to the difficulty of precipitating the corresponding heptafluoroniobate salts and is due, in part, to the aggressively reactive and corrosive nature of such salts, such that niobium produced by that process is very impure. Further, niobium oxide is usually unstable. See, e.g., N. F. Jackson et al, Electrocomponent Science & Technology, Vol. 1, pp. 27–37 (1974).

Accordingly, niobium has only been used in the capacitor industry to a very minor extent, predominantly in areas of with lower quality requirements.

However, niobium oxide dielectric constant is about 1,5 times as high as that of a similar tantalum oxide layer, which should allow in principle, for higher capacitance of niobium capacitors, subject to considerations of stability and other factors.

As for tantalum itself, despite the success of the $K_2TaF_7$/sodium reduction process, there are several drawbacks to this method.

It is a batch process subject to the inherent variability in the system; as a result, batch to batch consistency is difficult. Post reduction processing (mechanical and hydrometallurgical separations, filtering) is complex, requiring considerable human and capital resources and it is time consuming. The disposal of large quantities of reaction products containing fluorides and chlorides can be a problem. Of fundamental significance, the process has evolved to a state of maturity such that the prospects for significant advances in the performance of the tantalum powder produced are limited.

Over the years, numerous attempts were made to develop alternate ways for reducing tantalum and similar metal compounds, including Nb-compounds, to the metallic state (Miller, G. L. "Tantalum and Niobium," London, 1959, pp. 188–94; Marden, J. W. and Rich, M. H., U.S. Pat. No. 1,728,941, 1927; and Gardner, D., U.S. Pat. No. 2,516,863 1946; Hurd, U.S. Pat. No. 4,687,632). Among these were the use of active metals other than sodium, such as calcium, magnesium and aluminum and raw materials such as tantalum pentoxide and tantalum chloride. As seen in Table I, below, the negative Gibbs free energy changes indicate that the reduction of the oxides of Ta, Nb and other metals with magnesium to the metallic state is favorable; reaction rate and method determine the feasibility of using this approach to produce high quality powders on a commercial scale. To date, none of these approaches were commercialized significantly because they did not produce high quality powders. Apparently, the reason these approaches failed in the past was because the reductions were carried out by blending the reducing agents with the metal oxide. The reaction took place in contact with the molten reducing agent and under conditions of inability to control the temperature of highly exothermic reactions. Therefore, one is unable to control morphology of the products and residual reducing metal content.

TABLE 1

Gibbs Free Energy Change for
Reduction of Metal Oxides with Magnesium
$M_xO_y(s) + yMg(g) \rightarrow yMgO(s) + xM(s)$

| Temperature | Gibbs Free Energy Change (Kcal/mole oxide) | | | | | |
|---|---|---|---|---|---|---|
| ° C. | $Ta_2O_5$ | $Nb_2O_5$ | $TiO_2$ | $V_2O_3$ | $ZrO_2$ | $WO_2$ |
| 200 | −219 | −254 | −58 | −133 | −22 | −143 |
| 400 | −215 | −249 | −56 | −130 | −21 | −141 |
| 600 | −210 | −244 | −55 | −126 | −20 | −139 |
| 800 | −202 | −237 | −52 | −122 | −18 | −137 |
| 1000 | −195 | −229 | −50 | −116 | −15 | −134 |
| 1200 | −186 | −221 | −47 | −111 | −13 | −131 |
| 1400 | −178 | −212 | −45 | −106 | −11 | −128 |

The use of magnesium to deoxidize or reduce the oxygen content of tantalum metal is well known. The process involves blending the metal powder with 1–3 percent magnesium and heating to achieve the reduction process. The magnesium is in the molten state during a portion of the heating time. In this case, the objective is to re-move 1000–3000 ppm oxygen and only a low concentration of MgO is produced. However, when a much greater quantity of tantalum oxide is reduced a large quantity of magnesium oxide is generated. The resulting mixture of magnesium, tantalum oxide and magnesium oxide can under conditions of poorly controlled temperature, form tantalum-magnesium-oxygen complexes that are difficult to separate from the tantalum metal.

It is a principal object of the invention to provide a new approach to production of high performance, capacitor grade tantalum and niobium powders that provides a means of eliminating one or more, preferably all, the problems of traditional double salt reduction and follow on processing.

It is further object of the invention to enable a continuous production process.

It is a further object of the invention to provide improved metal forms.

Another object is to provide niobium/tantalum alloy powders of capacitor grade quality and morphology.

SUMMARY OF THE INVENTION

We have discovered that the prior art problems can be eliminated when metal oxides such as $Ta_2O_5$ and $Nb_2O_5$ and suboxides in massive amounts are reduced with magnesium in gaseous form, substantially or preferably entirely. The oxide source should be substantially or preferably entirely in solid. The oxide is provided in the form of a porous solid with high access throughout its mass by the gaseous reducing agent.

The metals that can be effectively produced singly or in multiples (co-produced) through the present invention are in the group of Ta, Nb, and Ta/Nb alloy, any of these alone or with further inclusion of added or co-produced Ti, Mo, V, W, Hf and/or Zr. The metals can also be mixed or alloyed during or after production and/or formed into useful compounds of such metals. The respective stable and unstable oxide forms of these metals can be used as sources. Metal alloys may be produced from alloyed oxide precursors, e.g. resulting from coprecipitation of a suitable precursor for the oxide.

Vapor pressures of some of the reducing agents are given as follows:

| Temperature (° C.) | Aluminum P (Atmospheres) |
|---|---|
| 2,000 | 53. × $10^{-2}$ |
| 2,100 | 1.0 × $10^{-1}$ |
| 2,200 | 1.9 × $10^{-1}$ |
| 2,300 | 3.3 × $10^{-1}$ |
| 2,400 | 5.6 × $10^{-1}$ |
| 2,500 | 9.0 × $10^{-1}$ |
| 2,600 | 1.4 |

| Temperature (° C.) | Magnesium P (Atmospheres) |
|---|---|
| 800 | 4.7 × $10^{-2}$ |
| 850 | 8.9 × $10^{-2}$ |
| 900 | 1.6 × $10^{-1}$ |
| 950 | 2.7 × $10^{-1}$ |
| 1000 | 4.8 × $10^{-1}$ |
| 1050 | 7.2 × $10^{-1}$ |
| 1100 | 1.1 |

| Temperature (° C.) | Calcium P (Atmospheres) |
|---|---|
| 1,000 | 1.7 × $10^{-2}$ |
| 1,100 | 5.1 × $10^{-2}$ |
| 1,200 | 1.3 × $10^{-1}$ |
| 1,300 | 2.9 × $10^{-1}$ |
| 1,400 | 6.0 × $10^{-1}$ |
| 1,500 | 1.1 |

| Temperature (° C.) | Lithium P (Atmospheres) |
|---|---|
| 1,000 | 5.1 × $10^{-2}$ |
| 1,100 | 1.4 × $10^{-1}$ |
| 1,200 | 3.8 × $10^{-1}$ |
| 1,300 | 7.2 × $10^{-1}$ |
| 1,400 | 1.4 |

The temperature of reduction varies significantly depending on the reducing agent used. The temperature ranges for reduction of (Ta, Nb) oxide are: with $Mg_{(gas)}$–800–1,100° C., $Al_{(gas)}$–1,100–1,500° C., $Li_{(gas)}$–1,000–1,400° C., $Ba_{(gas)}$–1,300–1,900° C.

Different physical properties as well as morphology of the metal powder produced by reduction can be achieved by variations of temperature and other conditions of processing within the effective reduction range.

One embodiment of the invention includes a first step of reducing an oxide source of selected metal(s) substantially to free 80–100% (by weight) of the metal values therein as primary powder particles, then leaching or other steps of hydrometallurgy to separate the metal from residual reducing agent oxide and other byproducts of the reduction reaction and from residual condensed reducing agent (optionally), followed by one or more deoxidation steps under less concentrated reagent conditions than in the first gross reduction step (and with better tolerance of molten state of the reducing agent), then further separation as might be needed.

In accordance with this first embodiment the invention provides for a single stage reduction process for the production of metal powders as cited above, comprising the steps of:

(a) providing an oxide or mixed oxides of the metal(s), the oxide itself being in a form that is traversable by gas, (b) generating a gaseous reducing agent at a site outside the oxide mass and passing the gas through the mass at an elevated temperature, (c) the reactants selection, porosity of the oxide, temperature and time of the reduction reaction being selected for substantially complete reduction of the oxide(s) to free the metal portion thereof, the residual oxide of reducing agent formed in the reaction being easily removable, whereby a high surface area, flowable metal powder is formed in a process that essentially avoids use of molten state reducing agent in production of metal or alloy powder.

Preferred reducing agents used in this reduction process of the first embodiment are Mg, Ca and/or their hydrides. Particularly preferred is Mg.

Preferred is the production of Nb and/or Ta metals, optionally alloyed with each other and/or with alloying elements, selected from the group consisting of Ti, Mo, W, Hf, V and Zr.

A second embodiment of the invention provides for a two-stage reduction process, comprising the steps of:

(a) providing an oxide or mixed oxide of the metal(s), the oxide being in a form that is traversible by gas, (b) passing a hydrogen containing gas, alone or with gaseous diluent, through the mass at an elevated temperature in a manner for partial reduction of the oxide (s), (c) the porosity of the oxide, temperature and time of reduction reaction being selected to remove at least 20% of the oxygen contained in the oxide to produce a suboxide, (d) reducing the suboxide with reducing metal(s) and/or hydrides of one or more reducing metals, thereby substantially completely reducing the oxide to free the metal portion thereof.

Preferrably the reducing metals and/or metal hydrides are brought into contact with the suboxide in gaseous form.

Preferred reducing metals in the second reduction step of this second embodiment are Mg and/or Ca and/or their hydrides. Particularly preferred is Mg.

Reduction temperature preferably (for Mg) is selected between 850° C. up to normal boiling point (1150° C.)

The process according to the present invention (both embodiments) specifically has been developed to provide capacitor grade tantalum and niobium and tantalum niobium alloy powders and Ta/Nb materials or application of equivalent purity and/or morphology needs. The greatest gap of the state of the art is filled in part by the availability of capacitor grade niobium enabled by this invention, but a segment of the tantalum art is also enhanced thereby. In all cases the tantalum and/or niobium may be enhanced by alloying or compounding with other materials during the reduction reaction production of the tantalum/niobium or thereafter. Among the requirements for such powders is the need for a high specific surface presintered agglomerate structure of approximately spherical primary particles which after pressing and sintering results in a coherent porous mass providing an interconnected system of pore channels with gradually narrowing diameter to allow easy entrance of the forming electrolyte for anodization and manganese nitrate solution [$Mn(NO_3)_2$] for manganization.

The reduction of oxides with gaseous reducing agents at least during the initial reduction phase allows for easy control of temperature during reduction to avoid excessive presintering. Furthermore, as compared to prior art proposals using liquid reducing metals, the controlled reduction with gaseous reducing metals does not lead to contamination of the reduced metal with the reducing metal by incorporation into the reduced metal lattice. It has been found that such contamination mainly occurs during the initial reduction of (in case of Nb) $Nb_2O_5$ to $NbO_2$. This at first appeared surprising because niobium suboxide ($NbO_2$) contains only 20% less oxygen than niobium pentoxide ($NbO_{2.5}$). This effect was traced back to the fact that the suboxide forms a considerably more dense crystal lattice than the pentoxide. The density of $NbO_{2.5}$ is 4.47 $g/cm^3$, whilst that of $NbO_2$ is 7.28 $g/cm^3$, i.e., the density is increased by 1.6 times by the removal of only 20% of the oxygen. Taking into account the different atomic weights of niobium and oxygen, a reduction in volume of 42% is associated with the reduction of $NbO_{2.5}$ to $NbO_2$. Accordingly, Applicants state (without limiting the scope of the invention thereby) that the effect according to the invention can be explained in that during the reduction of the pentoxide magnesium in contact with the oxide is able to diffuse relatively easily into the lattice, where it has a high mobility, whereas the mobility of magnesium in the suboxide lattice is significantly reduced. Accordingly, during the reduction of the suboxide the magnesium substantially remains on the surface and remains accessible to attack by washing acids.

This even applies in case of a controlled reduction with gaseous magnesium. Obviously in this case reduction occurs also during the critical initial reduction to suboxide only at the surface of the oxide, and magnesium oxide formed during reduction does not enter the oxide or suboxide powder. Preferred temperature during reduction with magnesium gas is between 900 and 1100° C., particularly preferred between 900 and 1000° C.

Temperature may be increased up to 1200° C. after at least 20% of the oxygen is removed to improve presintering.

The reduction of the pentoxide with hydrogen produces a suboxide which is already sintered with the formation of agglomerates comprising stable sintered bridges, which have a favorable structure for use as a capacitor material.

Lower temperatures necessitate longer times of reduction. Moreover, the degree of sintering of the metal powders to be produced can be adjusted in a predeterminable manner by the choice of reduction temperature and reduction time. The reactors are preferably lined with molybdenum sheet or by a ceramic which is not reduced by $H_2$, in order to prevent contamination.

Furthermore, the reduction time and reduction temperature should be selected so that at least 20% of the oxygen is removed from the pentoxide. Higher degrees of reduction are not harmful. However, it is generally not possible to reduce more than 60% of the oxygen within practicable time scales and at tolerable temperature.

After a degree of reduction of 20% or more has been reached, the suboxide is present. According to this process embodiment the reduction product is preferably still held (annealed) for some time, most preferably for about 60 to 360 minutes, at a temperature above 1000° C. It appears that this enables that the new, dense, crystal structure can be formed and stabilized. Since the rate of reduction decreases very considerably with the degree of reduction, it is sufficient to heat the suboxide at the reduction temperature under hydrogen, optionally with a slight decrease in temperature. Reduction and annealing times of 2 to 6 hours within the temperature range from 1100 to 1500° C. are typically sufficient. Moreover, reduction with hydrogen has the advantage that impurities such as F, Cl and C, which are critical for capacitor applications, are reduced to less than 10 ppm, preferably less than 2 ppm.

The suboxide is subsequently cooled to room temperature (<100° C.) in the reduction apparatus, the suboxide powder is mixed with finely divided powders of the reducing metals or metal hydrides and the mixture is heated under an inert gas to the reduction temperature of the second stage. The reducing metals or metal hydrides are preferably used in a stoichiometric amount with respect to residual oxygen of the acid earth metal suboxide, and are most preferably used in an amount which is slightly in excess of the stoichiometric amount.

One particularly preferred procedure consists of using an agitated bed in the first stage and of carrying out the second stage, without intermediate cooling, in the same reactor by introducing the reducing metals or metal hydrides. If magnesium is used as the reducing metal, the magnesium is preferably introduced as magnesium gas, since in this manner the reaction to form metal powder can readily be controlled.

After the reduction whether according to the one-stage or to the two-stage reduction process to metal is complete, the metal is cooled, and the inert gas is subsequently passed through the reactor with a gradually increasing content of oxygen in order to deactivate the metal powder. The oxides of the reducing metals are removed in the manner known in the art by washing with acids.

Tantalum and niobium pentoxides are preferably used in the form of finely divided powders. The primary grain size of the pentoxide powders should approximately correspond to 2 to 3 times the desired primary grain size of the metal powders to be produced. The pentoxide particles preferably consist of free-flowing agglomerates with average particle sizes of 20 to 1000 $\mu$m, including a specific preference of a narrower range of most preferably 50 to 300 $\mu$m particle size.

Reduction of niobium oxide with gaseous reducing agents can be conducted in an agitated or static bed, such as a rotary kiln, a fluidized bed, a rack kiln, or in a sliding batt kiln. If a static bed is used, the bed depth should not exceed 5 to 15 cm, so that the reducing gas can penetrate the bed. Greater bed depths are possible if a bed packing is employed through which the gas flows from below. For tantalum, preferred equipment choices are described in Example 2 and the paragraph between Examples 2 and 3, below, with reference to FIGS. 1–4.

Niobium powders which are particularly preferred according to the invention are obtained in the form of agglomerated primary particles with a primary particle size of 100 to 1000 nm, wherein the agglomerates have a particle size distribution as determined by Mastersizer (ASTM-B822) corresponding to D10=3 to 80 $\mu$m, particularly preferred 3 to 7 $\mu$m, D50=20 to 250 $\mu$m, particularly preferred 70 to 250 $\mu$m, most preferably 130 to 180 $\mu$m and D90 =30 to 400, particularly preferred 230 to 400 $\mu$m, most preferably 280 to 350 $\mu$m. The powders according to the invention exhibit outstanding flow properties and pressed strengths, which determine their processability to produce capacitors. The agglomerates are characterized by stable sintered bridges, which ensure a favorable porosity after processing to form capacitors.

Preferably niobium powder according to the invention contains oxygen in amounts of 2500 to 4500 ppm/m$^2$ surface and is otherwise low in oxygen, up to 10,000 ppm nitrogen and up to 150 ppm carbon, and without taking into account a content of alloying metals has a maximum content of 350 ppm of other metals, wherein the metal content is mainly that of the reducing metal or of the hydrogenation catalyst metal. The total content of other metals amounts to not more than 100 ppm. The total content of F, Cl, S is less than 10 ppm.

Capacitors can be produced from the niobium powders which are preferred according to the invention, immediately after deactivation and sieving through a sieve of mesh size 400 $\mu$m. After sintering at a pressed density of 3,5 g/cm$^3$ at 1100° C. and forming at 40 V these capacitors have a specific capacitance of 80,000 to 250,000 $\mu$FV/g (as measured in phosphoric acid) and a specific leakage current density of less than 2 nA/$\mu$FV. After sintering at 1150° C. and forming at 40 V, the specific capacitor capacitance is 40,000 to 150,000 $\mu$FV/g with a specific leakage current density of less than 1 nA/$\mu$FV. After sintering at 1250° C. and forming at 40 V, capacitors are obtained which have a specific capacitor capacitance (as measured in phosphoric acid) of 30,000 to 80,000 $\mu$FV/g and a specific leakage current density of less than 1 nA/$\mu$FV.

The niobium powders which are preferred according to the invention have a BET specific surface of 1.5 to 30 m$^2$/g, preferably of 2 to 10 m$^2$/g.

Surprisingly it has been found that capacitors can be made from Nb/Ta-alloy powders in way that the capacitors have an appreciably higher specific capacitance obtained from capacitors made from pure Nb-and pure Ta-powers or anticipated for an alloy be simple linear interpolation. Capacitances ($\mu$FV) of capacitors with sintered Nb-powder anodes and sintered Ta-powder anodes having the same surface area are approximately equal. The reason is that the higher dielectric constant of the insulating niobium oxide layer (41 as compared to 26 of tantalum oxide) is compensated by the larger thickness of the oxide layer per volt (anodization voltage) formed during anodization. The oxide layer thickness per volt of Nb is about twice as thick as that formed on Ta (about 1.8 nm/V in the case of Ta and about 3.75 nm/V in the case of Nb). The present invention can provide a surface related capacitance ($\mu$FV/m$^2$) of alloy powder capacitors which is up to about 1.5 to 1.7 higher than the expected value from linear interpolation between Nb powder capacitors and Ta powder capacitors. This seems to indicate that oxide layer thickness per volt of anodization voltage of alloy powders of the invention is closer to that of Ta, whereas the dielectric constant of the oxide layer is closer to that of Nb. The foregoing surprisingly high capacitance of the alloy may be associated with a different structural form of oxide of alloy components compared to structure of oxides on surfaces of pure Nb powders. Indeed, preliminary measurements have revealed that oxide layer growth of a 15 at.-%Ta—85 at.-% Nb alloy is almost 2.75 nm/volt.

The present invention accordingly further comprises an alloy powder for use in the manufacture of electrolyte capacitors consisting primarily of niobium and containing up to 40 at.-% of tantalum based on the total content of Nb and Ta. Alloy powder in accordance with the present invention shall mean that the minor Ta-component shall be present in an amount greater than the amount of ordinary impurity of niobium metal, e.g. in an amount of more than 0.2% by weight (2000 ppm, corresponding to 2 at.-% for Ta).

Preferably, the content of Ta is at least 2 at.-% of tantalum, particularly preferred at least 5 at.-% of tantalum, most preferably at least 12 at.-% of tantalum, based on the total content of Nb and Ta.

Preferably the content of tantalum in the alloy powders in accordance with the invention is less than 34 at.-% of tantalum. The effect of capacitance increase is gradually increasing up to a ratio of Nb- to Ta-atoms of about 3. Higher than 25 at.-% Ta based on the total content of Nb and Ta does only slightly further increase the effect.

The alloy powders according to the invention preferably have BET-surfaces multiplied with the alloy density of between 8 and 250 $(m^2/g) \times (g/cm^3)$, particularly preferred between 15 and 80 $(m^2/g) \times (g/cm^3)$. The density of the alloy material may be calculated from the respective atomic ratio of Nb and Ta multiplied by the densities of Nb and Ta respectively.

The effect of capacitance increase of alloying is not limited to powders having the structure of agglomerated spherical grains. Accordingly the alloyed powders in accordance of the invention may have a morphology in the form agglomerated flakes preferably having have a BET-surface times density of between 8 and 45 $(m^2/g) \times (g/cm^3)$.

Particularly preferred alloy powders are agglomerates of substantially spherical primary particles having a BET-surface times density of 15 to 60 $(m^2/g) \times (g/cm^3)$. The primary alloy powders (grains) may have mean diameters of between 100 to 1500 nm, preferably 100 to 300 nm. Preferably the deviation of diameter of primary particles from mean diameter is less than a factor 2 in both directions.

The agglomerate powders may have a mean particle size as determined in accordance with ASTM-B 822 (Mastersizer) as disclosed for niobium powders above.

Particularly preferred alloy powders have a ratio of Scott density and alloy density of between 1.5 and 3 $(g/inch^3)/(g/cm^3)$.

Any production method known in the art for the production of capacitor grade tantalum powder may be used, provided that a precursor is used which is an alloyed precursor containing niobium and tantalum approximately at the atomic ratio of Nb and Ta desired in the metal powder alloy instead of precursor containing tantalum alone.

Useful alloy precursors may be obtained from coprecipitation of (Nb,Ta)-compounds from aqueous solutions containing water soluble Nb- and Ta-compounds e.g. coprecipitation of (Nb, Ta)-oxyhydrate from aqueous solution of heptafluoro-complexes by the addition of ammonia and subsequent calcination of the oxhydrate to oxide.

Flaked powders may be obtained by electron beam melting of a blend of high purity tantalum and niobium oxides, reducing the molten ingot, hydriding the ingot at elevated temperature, and comminuting the brittle alloy, dehydriding the alloy powder and forming it into flakes. The flakes are thereafter agglomerated by heating to 1100 to 1400° C. in the presence of a reducing metal such as Mg, optionally with doping with P and/or N. This process for the manufacture of "ingot derived" powder is generally known from U.S. Pat. No. 4,740,238 for the production of tantalum flaked powder and from WO 98/19811 for niobium flaked powder.

Particularly preferred Nb-Ta-alloy powders having the morphology of agglomerated spherical grains are produced from mixed (Nb, Ta)-oxides by reduction with gaseous reducing agent as described herein.

The metal powders produced are suitable for use in electronic capacitors and other applications including, e.g. the production of complex electro-optical, superconductive and other metal and ceramic compounds, such as PMN structures and high temperatures form metals and oxide.

The invention comprises the said powders, the methods of producing such powders, certain derivative products made from such powders and methods for making such derivative products.

The capacitor usage can be accompanied by other known artifacts of capacitor production such as doping with agents to retard sinter densification or otherwise enhance end product capacitance, leakage and voltage breakdown.

The invention enables several distinct breakthroughs in several of its various fields of application.

First, the well known high performance tantalum powders for making computer/telecommunications grade solid electrolyte, small size capacitors (high capacitance per unit volume and stable performance characteristics) can now be made with substantial net savings of cost, complexity and time.

Second, other reactive metals—especially Nb and alloys, e.g. Ta—Nb, Ta—Ti, Nb—Ti, can be introduced as replacement for Ta in capacitors in certain applications with a cost saving or as replacement for the high end Al market with much better performance, particularly enabling much smaller sizes for equivalent capacitance and use of solid electrolyte. Commercial aluminum electrolytic capacitors use wet electrolyte systems.

Other objects, features and advantages will be apparent from the following detailed description of preferred embodiments taken in conjunction with the accompanying drawing in which:

DETAILED DESCRIPTION OF PREFERRED EMBODIMENTS

EXAMPLE 1 (COMPARISON)

A mixture of $Ta_2O_5$ and magnesium was loaded into a tantalum tray and covered with tantalum foil. The magnesium stoichiometry was 109% of that required to completely reduce the tantalum oxide. The mixture was heated at 1000° for six hours in an argon atmosphere. The mixture was not agitated during the reduction process. After cooling, the products were passivated by programmed addition of oxygen. The result of the reduction process was a black spongy material that was difficult to break up. The product was leached with dilute mineral acid to remove the magnesium oxide, dried and screened. The yield of the coarse (+40 mesh) material was high at 25 percent. The impurity content of each (as % or ppm) and surface areas (SA, $cm^2/gm$) of the +40 and −40 fractions are given in Table 1.1, below. Both the magnesium and oxygen contents were high. The large percentage of coarse material and poor quality of the product made it unsuitable for use in capacitor applications.

TABLE 1.1

|  | O % | N ppm | C ppm | S ppm | Na ppm | K ppm | Mg ppm | Sa $cm^2/gm$ |
|---|---|---|---|---|---|---|---|---|
| +40 mesh | 7.6 | 840 | 21 | <5 | <1 | <10 | >7000 | 17,000 |
| −40 mesh | 4.7 | 413 | 57 | <5 | <5 | <10 | >7000 | 35,000 |

EXAMPLE 2

Figure 1:
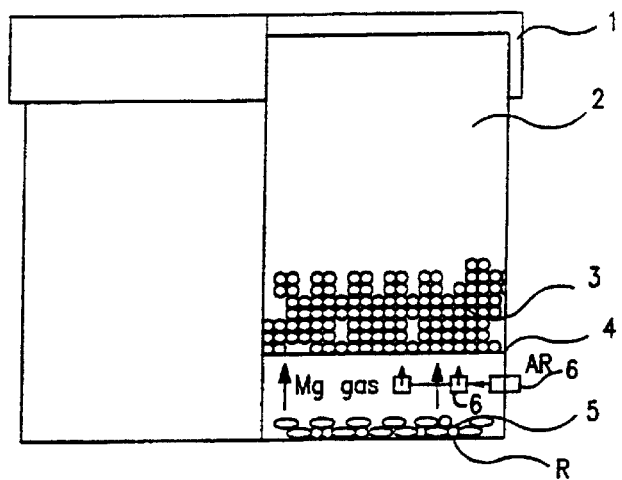
FIGS. 1–4 show sketch outlines of processing systems for practice of the present invention.

Referring to FIG. 1, a bed (3) of 200 grams of tantalum pentoxide w as placed on a porous tantalum plate 4 suspended above magnesium metal chips (5) contained in a tantalum boat. The container was covered with a tantalum lid and placed in a sealed retort with argon (Ar) passed through the sealed volume via nozzle (6). The boat was heated to and maintained at 1000° C. for six hours in an argon/magnesium gas atmosphere utilizing a bed (5) of solid magnesium chips maintained in a region wholly separate from the oxide bed. After cooling to room temperature, the product mixture was passivated by introducing argon-oxygen mixtures, containing 2, 4, 8, 15 inches (Hg, partial pressure) of $O_2$ (g), respectively, into the furnace. Each mixture was in contact with powder for 30 minutes. The hold time for the last passivation with air was 60 minutes.

Figure 5A:
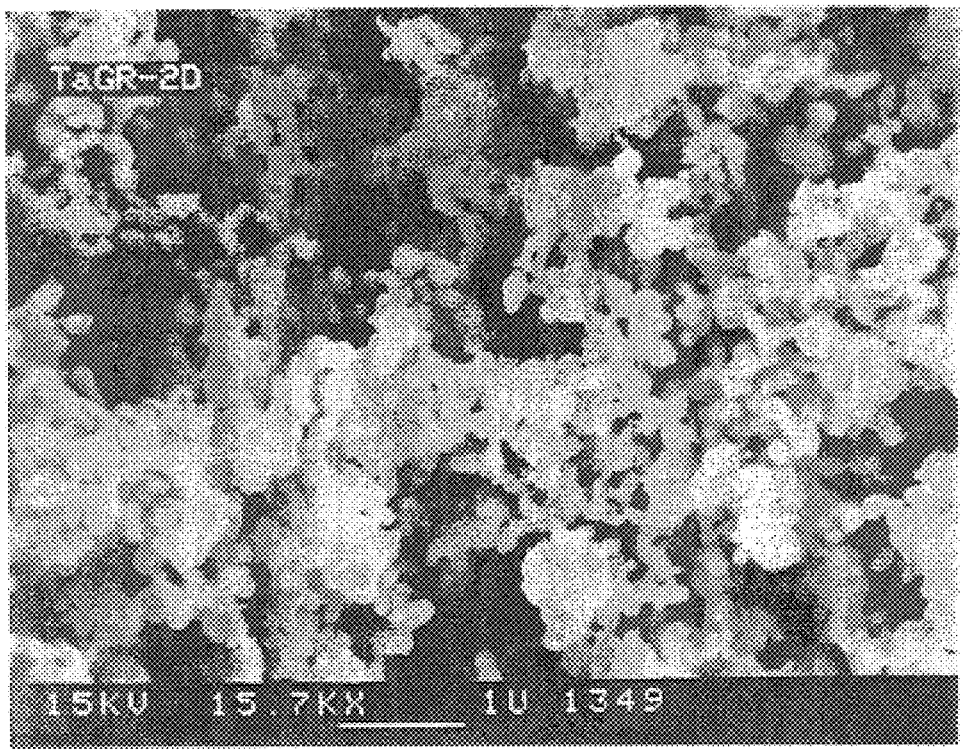
FIGS. 5A–12C are scanning electron micrographs (SEMs) of powders produced according to the present invention, including some SEMs of state of the art or comparison examples of metal powders made otherwise than in accordance with the present invention.
Figure 5B:
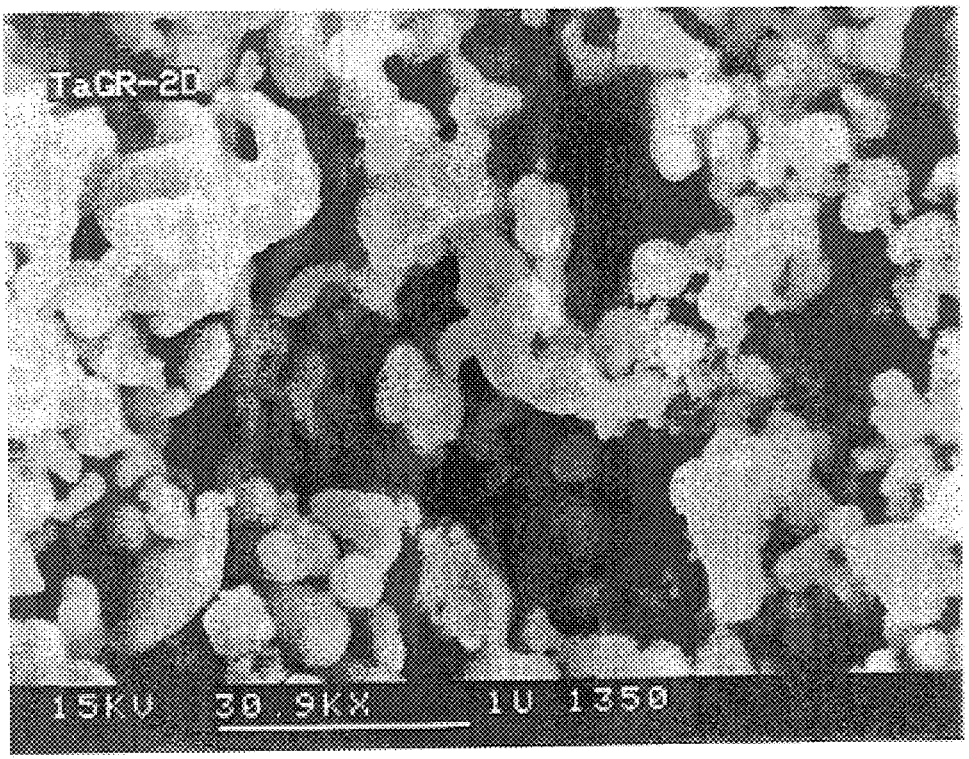
Figure 5C:
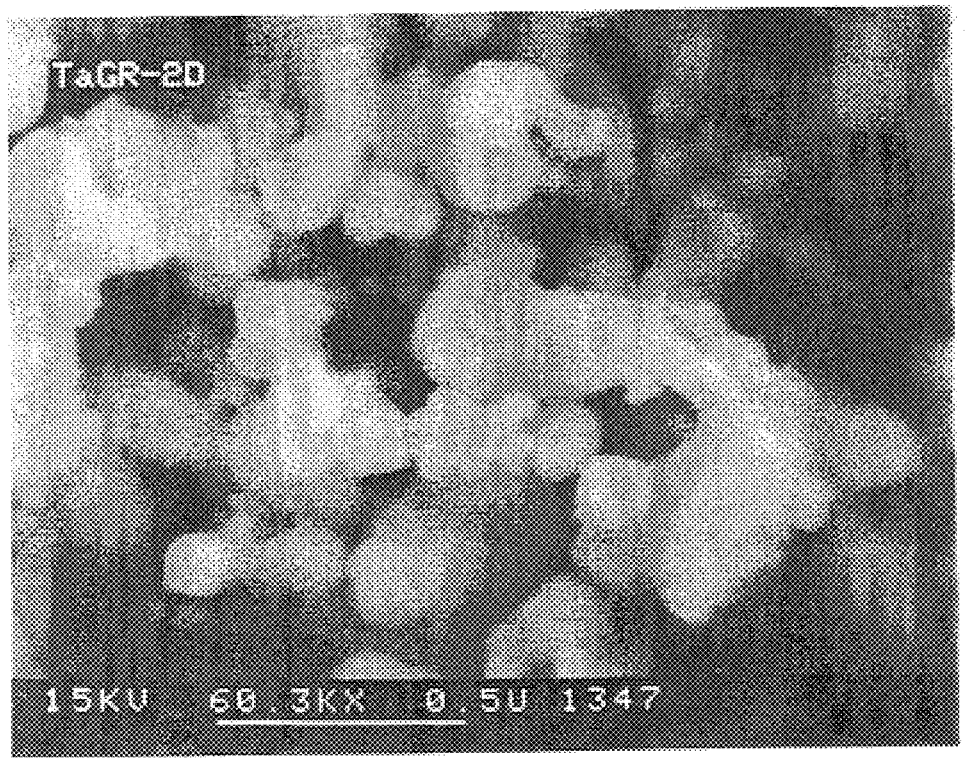
Figure 5D:
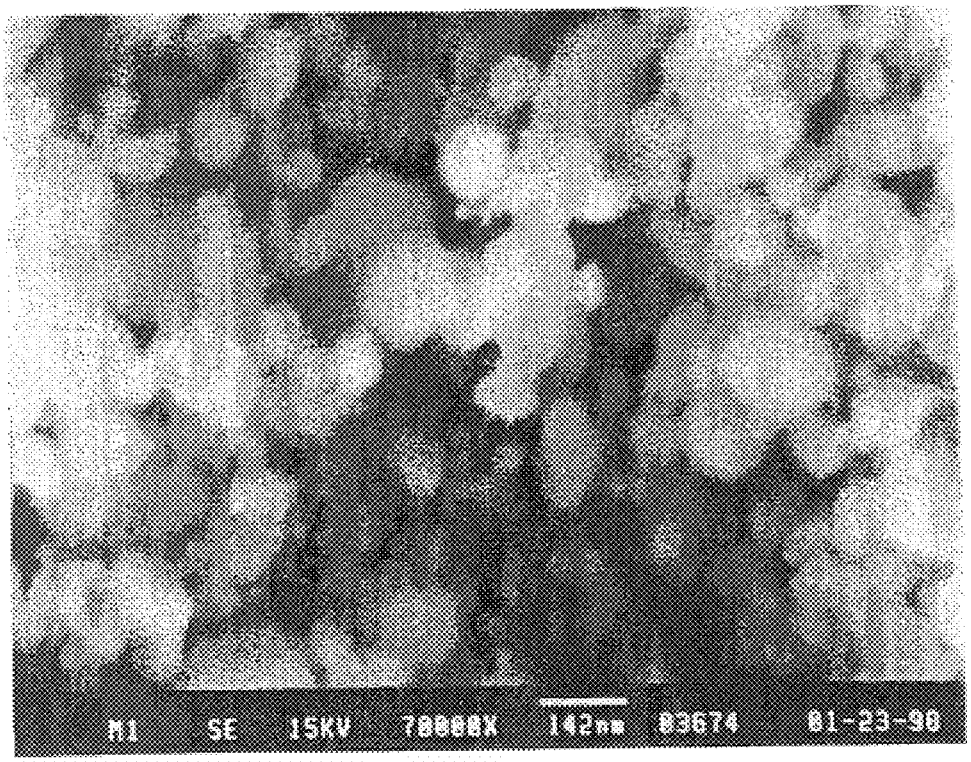
Figure 5E:
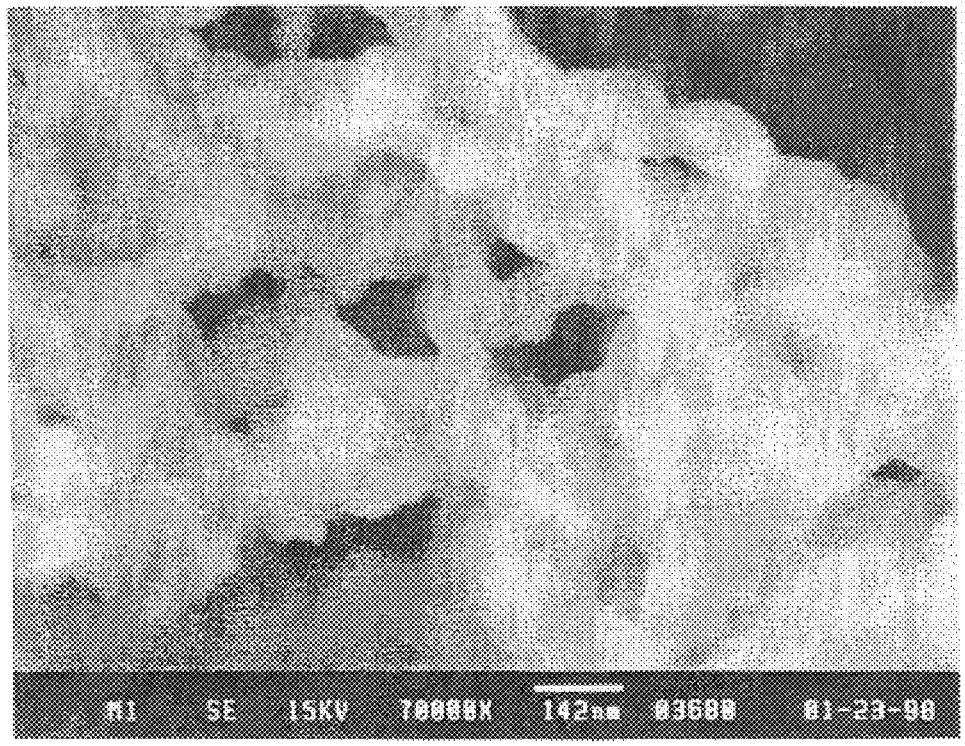

The magnesium oxide was separated from the tantalum powder by leaching with dilute sulfuric acid and then rinsed with high purity water to remove acid residues. The product was a free flowing, powder. Samples of the product (designated as Ta GR-2D) are shown in scanning electron micrographs (SEMs) at FIGS. 5A, 5B, 5C at 15,700, 30,900 and 60,300 magnifications, respectively, taken in an electron microscope operated at 15 kilovolts. A comparison is given in FIGS. 5D and 5E which are 70,000 magnification (×) SEMs of tantalum powder made by sodium reduction. Properties of the tantalum powder of FIGS. 5A, 5B, 5C are given in Table 2.1, below.

TABLE 2.1

| Content of Included Chemical Elements (ppm) | | | | | | | | | | Surface area |
|---|---|---|---|---|---|---|---|---|---|---|
| O | N | C | Cr | Fe | Ni | Na | K | Ca | Si | ($cm^2$/gm) |
| 12,900 | 126 | 75 | <5 | 23 | <5 | <1 | <10 | <2 | <8 | 37,600 |

The oxygen concentration to surface area ratio was consistent with surface oxygen only, indicating that the tantalum oxide was completely reduced.

Figure 2:
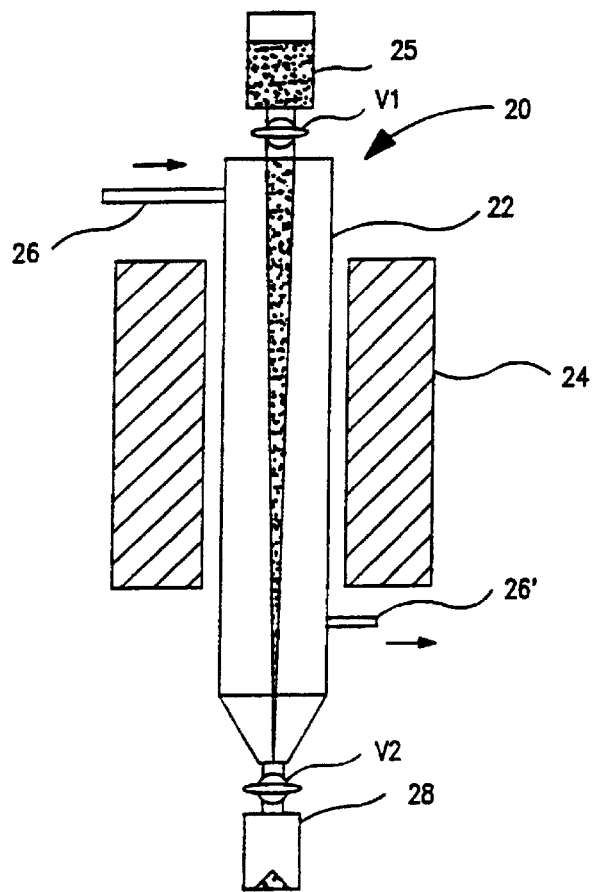
Figure 3:
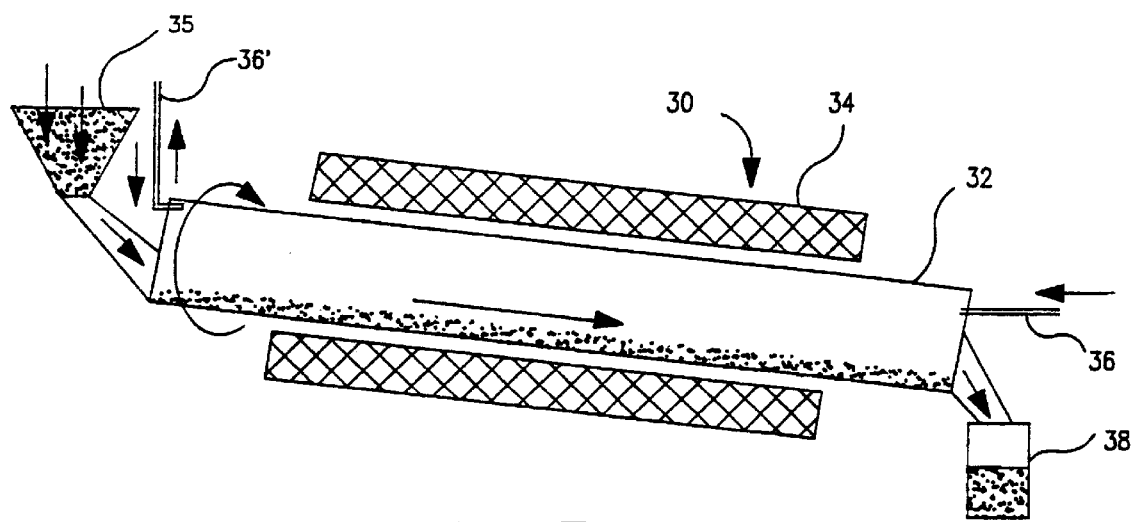
Figure 4:
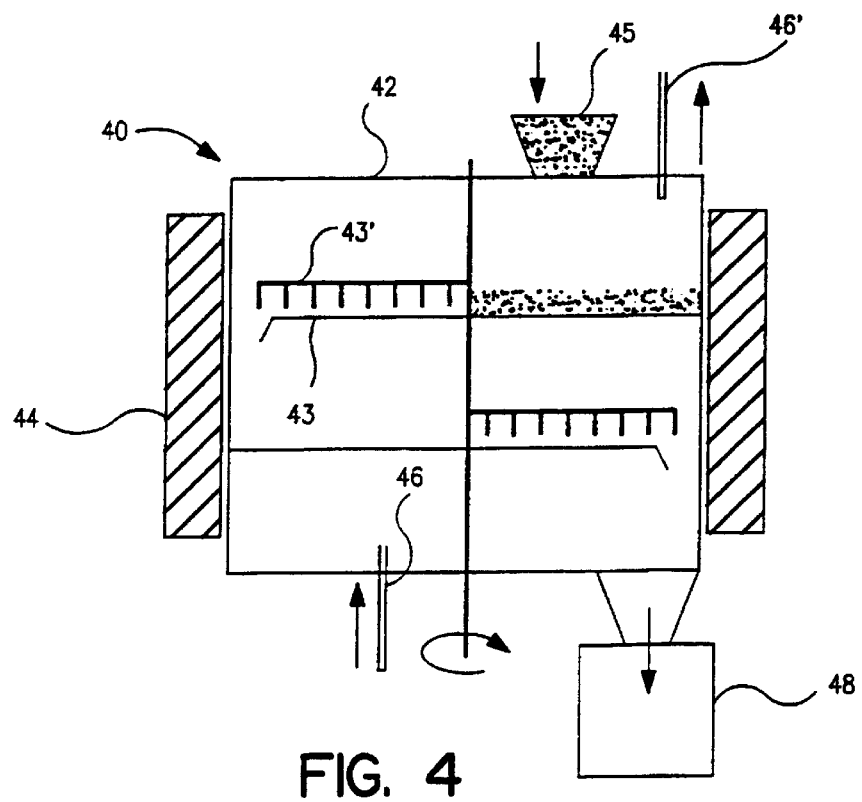

Alternate forms of reactor to the one shown in FIG. 1 (and discussed in Example 2) are shown in FIGS. 2–4. FIG. 2 shows a flash reactor 20 with a vertical tube surrounded by a heater 24, a feed source 25 of metal oxide and a source 26 of reducing agent (e.g. Mg) vapor (mixed in argon), an argon outlet 26' and a collector 28 for metal and oxide of the reducing agent. Valves V1, V2 are provided. Particles of the oxide drop through the tube and are flash reduced. FIG. 3 shows a rotary kiln 30 with an inclined rotating tube 32, heater 34, oxide hopper 35, gas source (reducing agent and diluent, e.g. argon) and outlet 36, 36', and collector 38 for metal and reducing agent oxide. FIG. 4 shows a multiple hearth furnace 40 with a retort 42 containing rotary trays 43 and splined paddles, 43 and splined paddles, 43, heater 44, oxide source 45, gas source and exit 46, 46' and collector 48. Still other forms of reactors such as conventional per se fluid bed furnace reactors or Contop, KIVCET types can be used.

EXAMPLE 3

Figure 6:
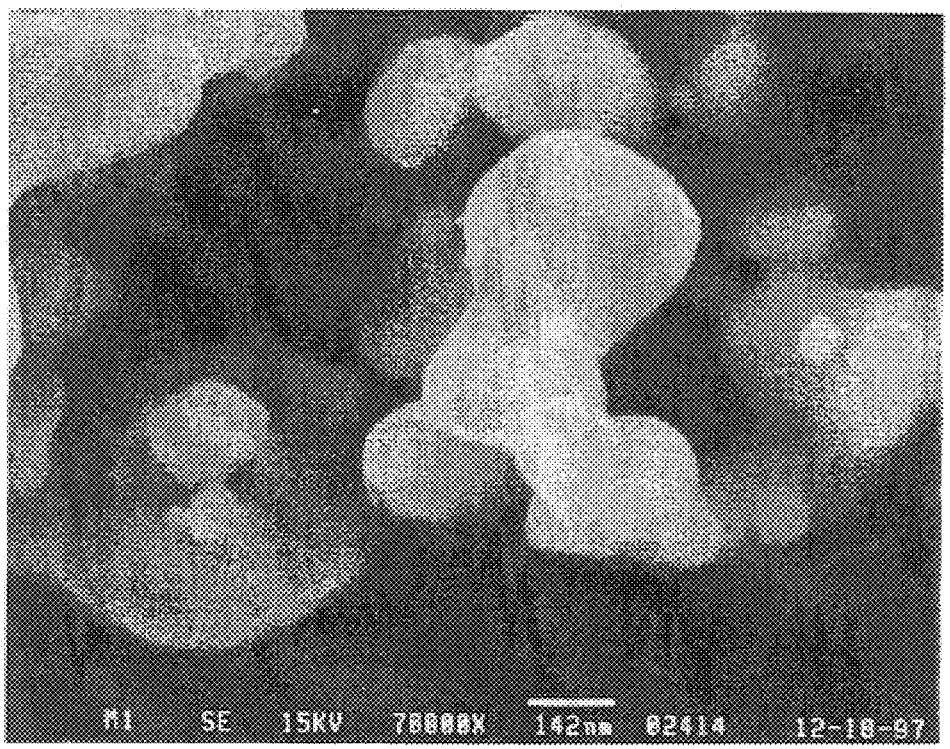
Figure 7A:
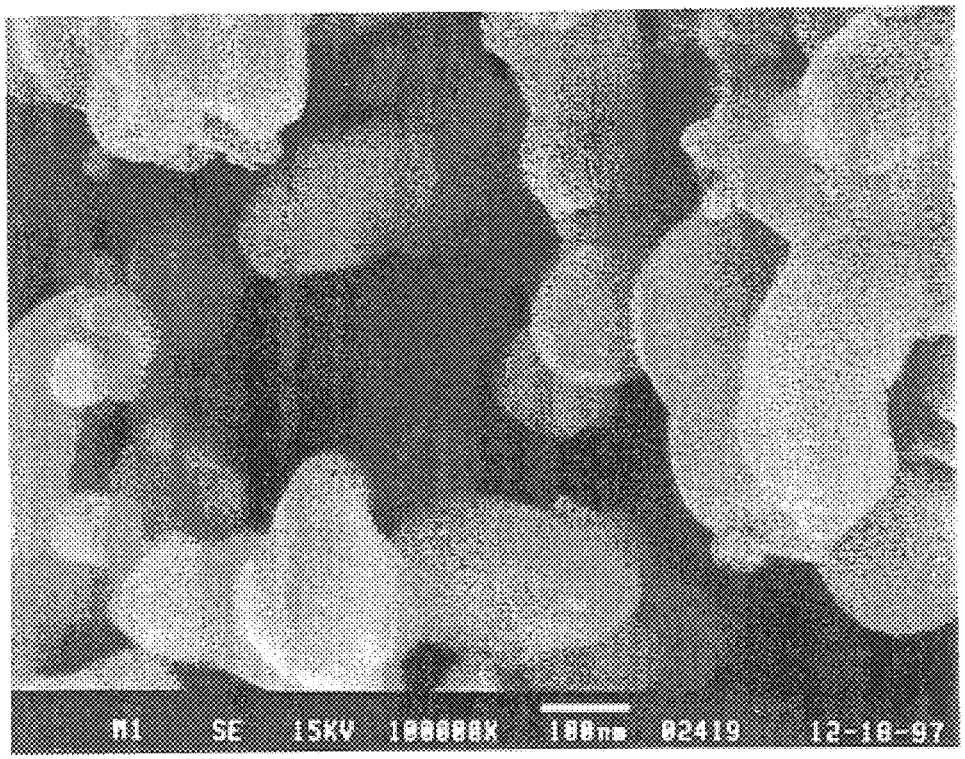
Figure 7B:
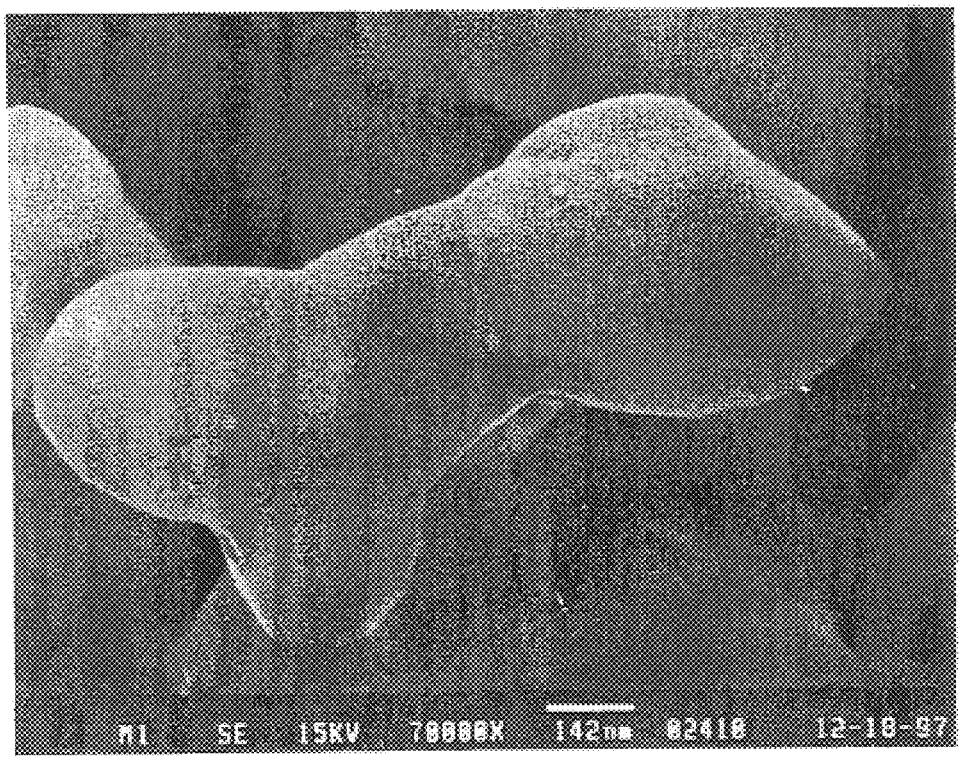

Tantalum powder with surface area of 57,000 $cm^2$/gm made according to the procedure in Example 2 was deoxidized by blending the powder with 2 W/W % Mg and heating at 850° C. for two hours in an argon atmosphere. Separation of reducing agent source and oxide is not necessary in this follow up deoxidation step. The deoxidized powder was allowed to cool and then passivated, leached, and dried. A SEM (100,000×) of the deoxidized (finished) powder appears at FIG. 7A and a SEM (70,000×) of finished sodium reduced powders appears at FIG. 7B. the morphology differences are apparent. After doping with 100 ppm P by adding an appropriate amount of $NH_4H_2PO_4$, the powder was pressed into pellets weighing 0.14 grams at a press density of 5.0 g/cc. A SEM of the further deoxidized powder is given at FIG. 6. The pellets were sintered in vacuum at 1200° C. for 20 minutes. The pellets were anodized to 30 volts in 0.1 volume percent (V/V %) $H_3PO_4$ solution at 80° C. The formation current density was 100 mA/gm and the hold time at the formation voltage was two hours. The average capacitance of the anodized pellets was 105, 000 $\mu F$ (V)/gm and the leakage current measured after five minutes application of 21V was 0.1 nA/$\mu F$ (V).

EXAMPLE 4

Figure 7C:
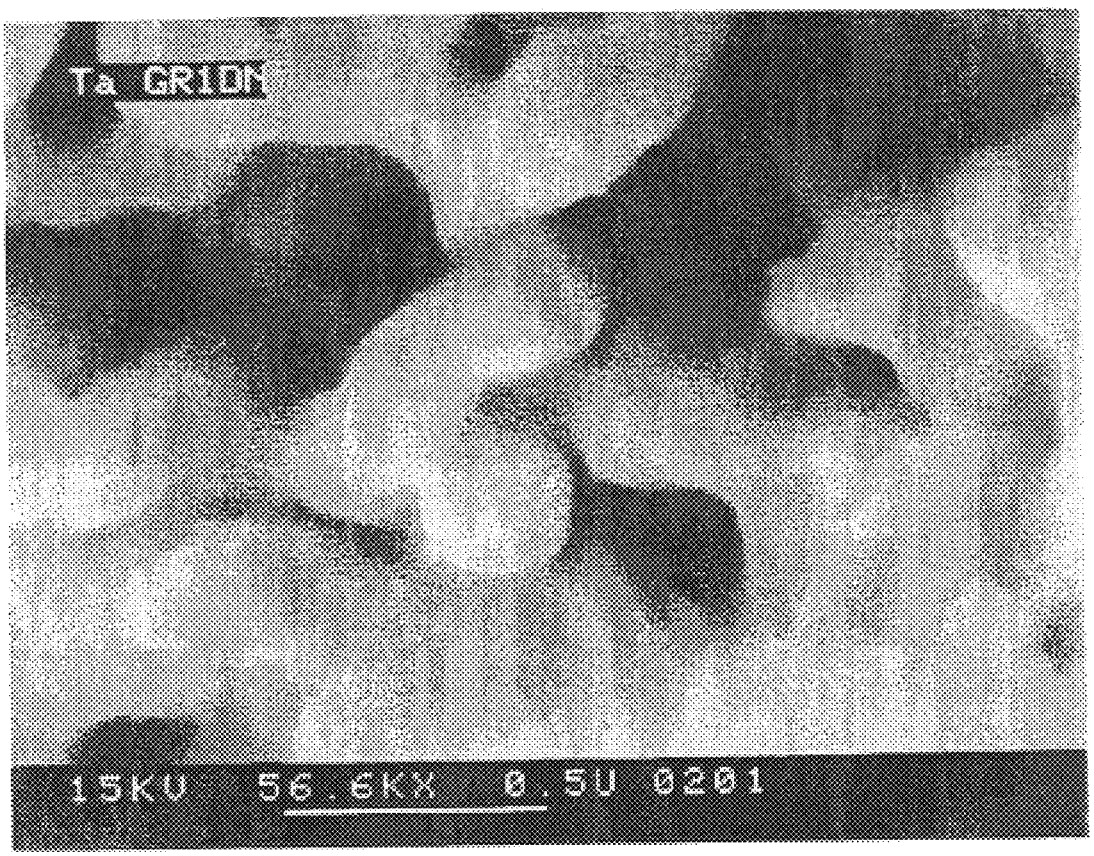

Powder with surface area of 133,000 $cm^2$/gm and bulk density of 27.3 $g/m^3$ made as described in Example 2 was treated as in Example 3. A SEM (56,600×) of the finished powder appears at FIG. 7C. Pellets made from the deoxidized powder were anodized to 16V using the conditions in Example 3. The average capacitance of the anodized pellets was 160,000 $\mu F$ (V)/gm.

EXAMPLE 5

Nine hundred grams of $Ta_2O_5$ was reduced with gaseous magnesium at 900° C. for two hours. The magnesium oxide was removed from the reduction product by leaching with dilute sulfuric acid. The resulting powder had a surface area of 70,000 $cm^2$/gm and was deoxidized at 850° C. for two hours using 8 W/W % magnesium. One (1.0) W/W % $NH_4Cl$ was added to the charge to nitride the tantalum. The deoxidized powder was treated as described in Example 3. The P doping level was 200 ppm. The powder was deoxidized again using the same time and temperature profile with 2.0 W/W % Mg and no $NH_4Cl$. Residual magnesium and magnesium oxide were removed by leaching with dilute mineral acid. The chemical properties of the powder are given in Table 5.1, below. The powder had a surface area of 9,000 $cm^2$/gm and excellent flowability. Pressed pellets were sintered at 1,350° C. for twenty minutes and anodized to 16V in 0.1 V/V % $H_3PO_4$ at 80° C.

The capacitance of the anodized pellets was 27,500 $\mu F$ (V)/gm and the leakage was 0.43 nA/$\mu F$ (V).

TABLE 5.1

| Chemical Element (ppm) | | | | | | | | | |
|---|---|---|---|---|---|---|---|---|---|
| O | N | C | Cr | Fe | Ni | Na | K | Ca | Si |
| 2610 | 2640 | 95 | 8 | 18 | <5 | 1 | <10 | <2 | 41 |

EXAMPLE 6

500 grams of $Ta_2O_5$ were reduced at 1,000° C. for six hours with gaseous magnesium. Properties of the primary powder so produced are given in Table 6.1, below:

TABLE 6.1

| O, ppm | N, ppm | C, ppm | Na, ppm | K, ppm | SA, $cm^2$/g |
|---|---|---|---|---|---|
| 19,000 | 1693 | 49 | <1 | <10 | 60,600 |

The primary powder was deoxidized at 850° C. for two hours. 4 W/W % Mg and 1 W/W % $NH_4Cl$ were added. MgO was leached with mineral acid. Then the powder was doped at 200 ppm P by adding the equivalent amount of $NH_4H_2PO_4$. The powder was deoxidized for the second time at 850° C. for two hours and then nitrided at 325° C. by adding a gaseous mixture containing 80% argon and 20% nitrogen. Some properties of the finished powder are given in Table 6.2, below.

TABLE 6.2

| O-ppm | N, ppm | C, ppm | Na, ppm | K, ppm | SA, cm²/g |
|---|---|---|---|---|---|
| 6050 | 3430 | 54 | <1 | <10 | 24,300 |

Pellets were made from the powder at a press density of 5.0 gm/cc. The sintered pellets were anodized at 80° C. to 16 volts in 0.1 W/W % $H_3PO_4$ solution. Capacitances and leakages as a function of sintering temperature are given in Table 6.3, below.

TABLE 6.3

| Sintering Temperature (° C.) | Capacitance $\mu$F (V)/gm | Leakage $\mu$A/$\mu$ F(V) |
|---|---|---|
| 1,200 | 143,000 | 0.77 |
| 1,250 | 121,000 | 0.88 |
| 1,300 | 96,000 | 1.01 |

EXAMPLE 7 (COMPARATIVE)

Potassium heptafluoroniobate ($K_2NbF_7$) was reduced with sodium using a stirred reactor molten salt process similar to the ones described by Hellier et al. and Hildreth et al., U.S. Pat. No. 5,442,978. The diluent salt was sodium chloride and the reactor was made from Inconel alloy. The niobium metal powder was separated from the salt matrix by leaching with dilute nitric acid ($HNO_3$) and then rinsing with water. Selected physical and chemical properties are given in Table 7.1, below. The very high concentrations of the metallic elements, nickel, iron and chromium, make the powders unsuitable for use as capacitor grade material. The contamination resulted because of the inherent corrosive nature of the $K_2NbF_7$. This property makes the sodium reduction process unsuitable for making capacitor grade niobium powder.

TABLE 7.1

| Sample | SA | SBD | FAPD | O (ppm) | Ni | Cr | Fe |
|---|---|---|---|---|---|---|---|
| 1 | 13820 | 8.7 | 1.76 | 6080 | 18000 | 2970 | 2660 |
| 2 | 11700 | 9.4 | 1.48 | 4930 | 11300 | 4790 | 2060 |

SBD=Scott Bulk Density (g/in³), FAPD=Fisher Average Particle Diameter ($\mu$)

EXAMPLE 8

Two hundred grams of niobium pentoxide was reduced as described in Example 2. The resulting product was a free flowing black powder and had a surface area of 200,800 cm²/gm. The passivated product was leached with dilute nitric acid solution to remove magnesium oxide and residual magnesium and then with high purity water to remove residual acid. This material was blended with ten (10.0) W/W % Mg and deoxidized at 850° C. for two hours. Physical and chemical properties of the powder are listed in table 8.1, below. The powder was doped with 100 ppm P as described in Example 3.

TABLE 8.1

Physical and Chemical Properties of Niobium Powder

| Chemical Element (ppm) | | | | | | | | | | Surface Area |
|---|---|---|---|---|---|---|---|---|---|---|
| O | N | C | Cr | Fe | Ni | Na | K | Ca | Si | cm²/gm |
| 13000 | 620 | 40 | 27 | 45 | 21 | 8 | 1 | 3 | 26 | 40,900 |

Figure 8A:
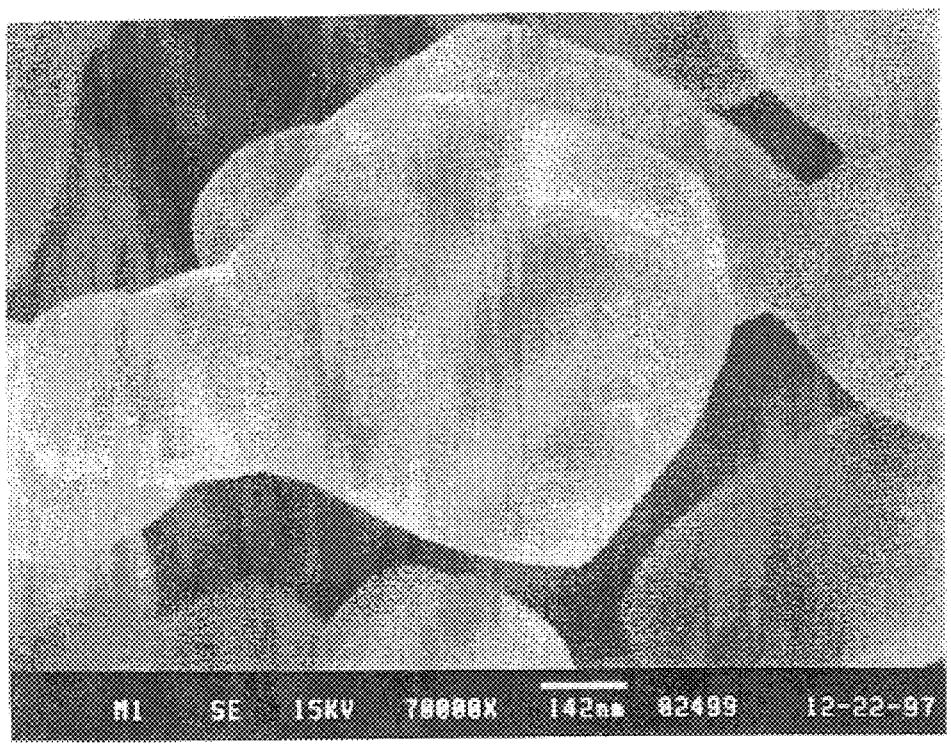
Figure 8B:
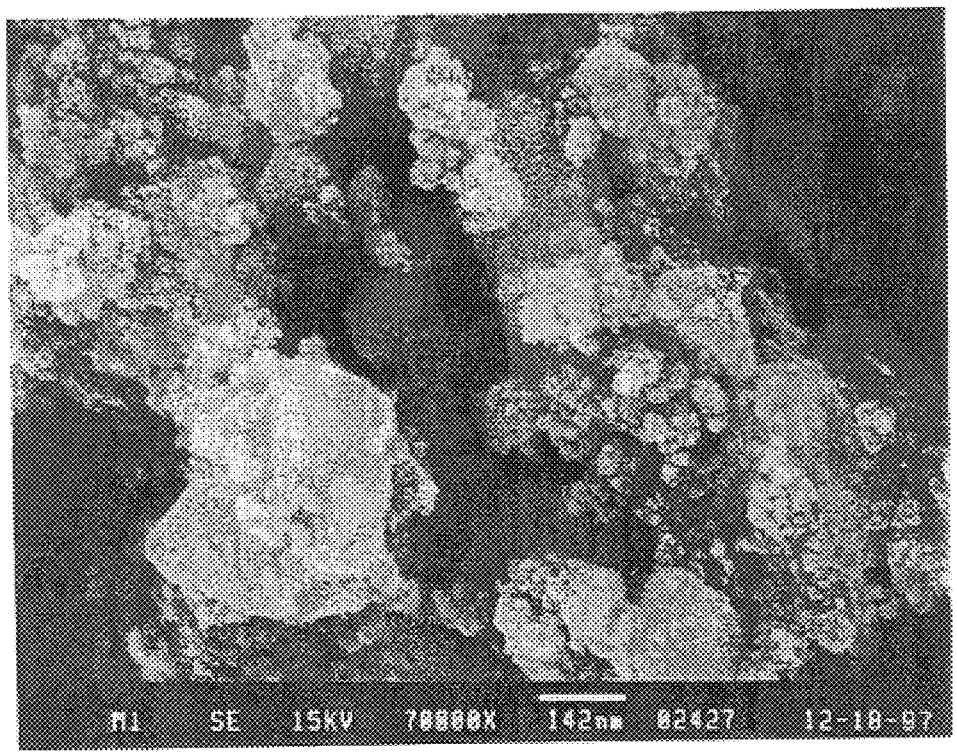
Figure 8C:
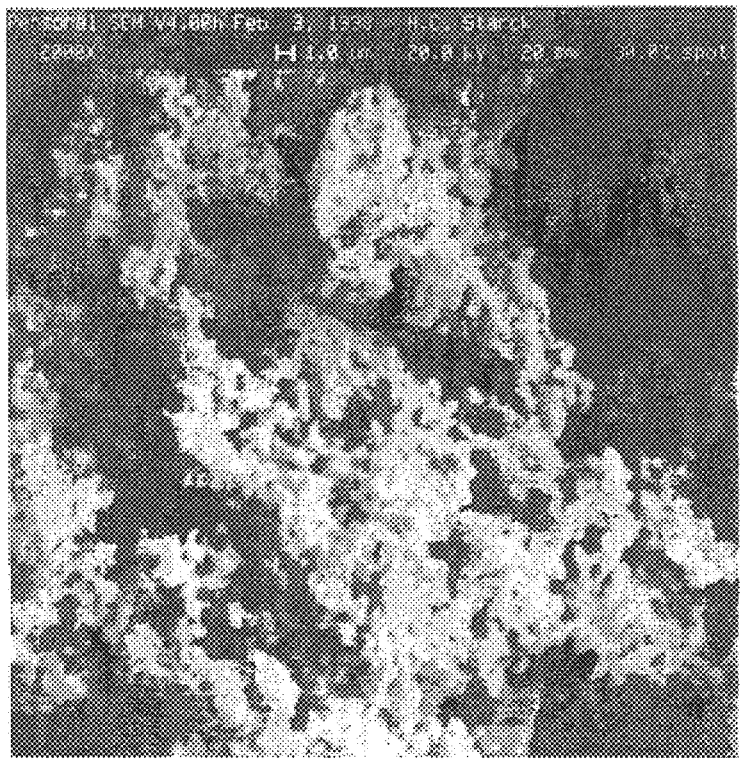
Figure 8D:
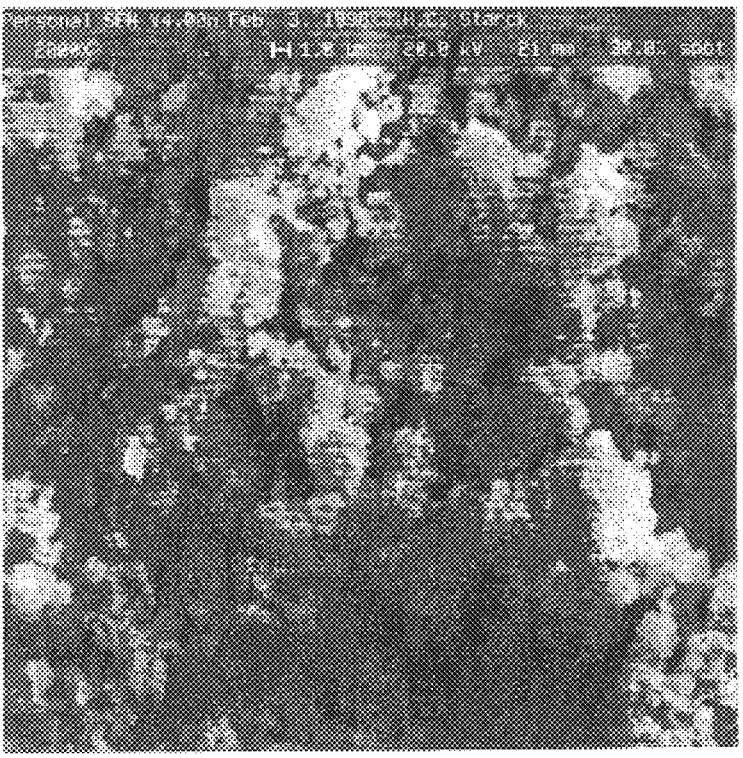

SEMs (70,000×) appear at FIGS. 8A and 8B, respectively, for niobium powders produced by liquid sodium (Ex. 7) and magnesium gas (Ex. 8) reduction. Note the clustering of small particles as barnacles on large ones is much more pronounced in FIG. 8B than in 8A. FIGS. 8C, 8D are SEMs (2,000×) of, respectively niobium powder as produced by sodium reduction and magnesium gas reduction.

The niobium powder produced by liquid sodium reduction has large (>700 nm) joined (300 nm+) grains protruding and facets that give the product a blocky shape and fine grain material (order of 10 nm, but some up to 75 nm) as barnacles while the niobium powder produced by magnesium gas reduction has a base grain size of about 400 nm and many smaller grains of about 20 nm thereon many of which smaller grains are themselves agglomerates of up to 100 nm in size.

EXAMPLE 9

Pellets weighing 0.14 gm were prepared from the niobium powder produced in Example 8. The pellets were anodized in 0.1 V/V % $H_3PO_4$ solution at 80° C. The current density was 100 mA/gm and the hold time at the formation voltage was two hours. Electrical results as a function of pellet press density, formation voltage and sintering temperature are given in Table 9.1, below.

TABLE 9.1

Summary of Electrical Properties (capacitance, leakage) of Niobium Powder at 3.0, 3.5 (g/cc) Press Densities

| Sintering Temperature (° C.) | Capacitance ($\mu$F (V)/gm) | | Leakage (nA/$\mu$F(V)) | |
|---|---|---|---|---|
| | 3.0 | 3.5 | 3.0 | 3.5 |
| | 16 V Formation | | | |
| 1300 | 29,500 | 20,000 | 1.6 | 4.7 |
| 1350 | 21,000 | 16,000 | 0.7 | 1.5 |
| | 40 V Formation | | | |
| 1250 | 53,200 | 44,500 | 2.1 | 4.0 |
| 1300 | 31,000 | 22,300 | 1.2 | 4.7 |
| 1350 | 26,500 | 20,000 | 0.7 | 1.0 |

EXAMPLE 10

Niobium oxide was reduced with gaseous magnesium as described in Example 8. The resulting powder was deoxidized twice. During the first deoxidation, 2.0 W/W % $NH_4Cl$ was added to the charge to nitride the powder. The deoxidation conditions were 850° C. for two hours with 7.0 W/W % Mg. After leaching and drying, the powder was doped with 200 ppm P. The second deoxidation was carried out at 850° C. for two hours using 2.5 W/W % Mg. The finished powder has a surface area of 22,000 cm²/gm and good flowability. The chemical properties are given in Table 10.1, below. Pellets were anodized to 16 volts in 0.1 VN % $H_3PO_4$ solution at 80° C. using a current density of 100 mA/g and a two-hour hold. The electrical properties are given in Table 10.2, below.

TABLE 10.1

Chemical Element (ppm)

| O | N | C | S | Cr | Fe | Ni | Si | Ta |
|---|---|---|---|----|----|----|----|----|
| 7490 | 8600 | 166 | 9 | <20 | 114 | <20 | 34 | <200 |

TABLE 10.2

Electrical Properties

| Sintering Temperature (° C.) | Capacitance ($\mu$F(V)/gm) | Leakage (nA/$\mu$F(V)) |
|---|---|---|
| 1250 | 68,000 | 0.24 |
| 1300 | 34,500 | 0.14 |
| 1350 | 11,300 | 0.32 |

EXAMPLE 11 a) The $Nb_2O_5$ used had a particle size of 1.7 $\mu$m as determined by FSSS (Fisher Sub Sieve Sizer) and comprised the following contents of impurities:

| Total (Na, K, Ca, Mg) | 11 ppm |
|---|---|
| Total (Al, Co, Cr, Cu, Fe, Ga, Mn, Mo, Ni, Pb, Sb, Sn, Ti, V, W, Zn, Zr) | 19 ppm |
| Ta | 8 ppm |
| Si | 7 ppm |
| C | <1 ppm |
| Cl | <3 ppm |
| F | 5 ppm |
| S | <1 ppm |

The $Nb_2O_5$ was passed in a molybdenum boat through a sliding batt kiln, under a slowly flowing hydrogen atmosphere, and was maintained in the hot zone of the kiln for 3.5 hours.

The suboxide obtained had a composition corresponding to $NbO_2$.

b) The product was placed on a fine-mesh grid under which a crucible was situated which contained magnesium in 1.1 times the stoichiometric amount with respect to the oxygen content of the suboxide.

The arrangement comprising the grid and crucible was treated for 6 hours at 1000° C. under an argon protective gas. In the course of this procedure, the magnesium evaporated and reacted with the overlying suboxide. The kiln was subsequently cooled (<100° C.) and air was gradually introduced in order to passivate the surface of the metal powder.

The product was washed with sulfuric acid until magnesium could no longer be detected in the filtrate, and thereafter was washed until neutral with deionized water and dried.

Analysis of the niobium powder gave the following impurity contents:

| O | 20,000 ppm (3300 ppm/m$^2$) |
|---|---|
| Mg | 200 ppm |
| Fe | 8 ppm |
| Cr | 13 ppm |
| Ni | 3 ppm |
| Ta | 110 ppm |
| C | 19 ppm |
| N | 4150 ppm |

The particle size distribution, as determined by Mastersizer, corresponded to
D10 4.27 $\mu$m
D50 160.90 $\mu$m
D90 318.33 $\mu$m The primary grain size was determined visually as about 500 nm. The Scott bulk density was 15.5 g/inch$^3$. The BET specific surface was 6.08 m$^2$/g. The flowability, determined as the Hall Flow, was 38 seconds.

c) Anodes with a diameter of 3 mm, a length of 5.66 mm, an anode mass of 0.14 g and a pressed density of 3.5 g/cm$^3$ were produced from the niobium powder by sintering on a niobium wire for the times and at the temperatures given in Table 11.1.

The pressed strength of the anodes, as determined according to Chatillon, was 6.37 kg. The anodes were formed at 80° C. in an electrolyte containing 0.1% by volume of $H_3PO_4$ at a current density of 100/150 mA at the voltage given in Table 11.1 and the capacitor characteristics were determined; see Table 11.1

TABLE 11.1

| Sample | Sintering Temp./time ° C. min | Sintered density g/cm$^3$ | Wire drawing strength N | Forming voltage V | Capacitance $\mu$FV/g | Leakage current nA/$\mu$FV |
|---|---|---|---|---|---|---|
| a | 1250/20 | 5.1 | | 16 | 41,126 | 0.47 |
| b | | 5 | | 40 | 41,725 | 0.7 |
| c | | 5 | | 70 | 23,721 | 2.13 |
| d | 1150/20 | 3.9 | 35.6 | 16 | 111,792 | 0.77 |
| e | | 4 | 35.6 | 40 | 147,292 | 0.43 |
| f | 1100/20 | 3.75 | 36.6 | 16 | 194,087 | 0.4 |
| g | | 3.7 | 36.1 | 40 | 194,469 | 0.36 |

EXAMPLE 12

Example 11 was repeated, with the difference that the temperature in the first reduction stage was 1300° C.

The metal powder had the following properties:
Mastersizer
D10 69.67 $\mu$m
D50 183.57 $\mu$m
D90 294.5 $\mu$m
Primary grain size (visual) 300–400 nm
BET specific surface 5 m$^2$/g
Free-flowing.
The pressed strength was extremely high:
13 kg at a pressed density of 3.5 g/cm$^3$, and
8 kg at a pressed density of 3 g /cm$^3$.
After sintering at 1100° C. for 20 minutes (pressed density 3 g/m$^3$), and after forming at 40 V, a capacitance of 222,498 $\mu$FV/g and a leakage current of 0.19 nA/$\mu$FV were measured.

EXAMPLE 13

This example shows the effect of the reduction temperature in the first stage on the properties of the niobium powder:

Three batches of niobium pentoxide were treated for 4 hours under hydrogen at 1100° C., 1300° C. or 1500° C., under conditions which were otherwise the same.

The batches were subsequently reduced to niobium metal with Mg gas (6 hours, 1000° C.). The MgO which was formed in the course of the reaction, together with excess Mg, were washed out with sulfuric acid. The following powder properties were obtained:

| Reduction temperature | 1100° C. | 1300° C. | 1500° C. |
|---|---|---|---|
| Suboxide: | | | |
| BET m$^2$/g[1] | 1.03 | 0.49 | 0.16 |
| Hall Flow[2] | non-flowing | 25 g in 48 sec. | 25 g in 20 sec. |
| Niobium metal: | | | |
| BET m$^2$/g | 9.93 | 7.8 | 5.23 |
| FSSS μm[3] | 0.6 | 0.7 | 6.8 |
| Hall Flow | non-flowing | 25 g in 85 sec. | 25 g in 19 sec. |
| SD g/inch[4] | 16.8 | 16.5 | 16.8 |
| Mg ppm | 240 | 144 | 210 |
| O ppm | 40,000 | 28,100 | 16,600 |

[1]BET specific surface
[2]flowability
[3]particle size as determined by Fisher Sub Sieve Sizer
[4]bulk density

EXAMPLE 14

A (Nb$_x$, Ta$_{1-x}$)$_2$O$_5$ precursor is prepared by coprecipitation of (Nb, Ta)-oxyhydrate from mixed aqueous solution of niobium and tantalum heptafluorocomplexes by the addition of ammonia with stirring and subsequent calcination of the oxyhydrate to oxide.

A lot of the mixed oxide powder having a nominal composition of Nb: Ta=90:10 (weight ratio) was placed in a molybdenum boat and passed through a sliding batt kiln under slowly flowing hydrogen atmosphere and was maintained in the hot zone of the kiln for 4 hours at 1300° C. After cooling down to room temperature the composition was determined from weight loss to be approximately (Nb$_{0.944}$Ta$_{0.054}$)O.

The suboxide was placed on a fine mesh grid under which a crucible was situated which contained magnesium in 1.2 times the stoichiometric amount with respect to the oxygen content of the suboxide. The arrangement comprising grid and crucible was treated for 6 hours at 1000° C. under an argon protective gas. The kiln was subsequently cooled to below 100° C. and air was gradually introduced in order to passivate the surface of the metal powder.

The product was washed with sulfuric acid until magnesium could no longer be detected in the filtrate, and thereafter washed until neutral with deionized water and dried.

Analysis of the alloy powder gave a tantalum content of 9.73 wt.-% and the following impurity contents (ppm):

O: 20500, Mg: 24, C: 39, Fe: 11, Cr: 19, Ni: 2, Mo: 100.

The primary grain size as determined visually was roughly 450 nm. BET specific surface was 6.4 m$^2$/g, Scott density 15.1 g/in$^3$, particle size (FSSS) was 0.87 μm.

Anodes with a diameter of 2.94 mm, a length of 3.2 mm and a pressed density of 3.23 g/cm$^3$ were produced from the alloy powder by sintering on a niobium wire for 20 minutes at 1150° C. Sintered density was 3.42 g/cm$^3$. The electrodes were anodized in an electrolyte containing 0.25% of H$_3$PO$_4$ until a final voltage of 40 V.

The capacitor characteristics were determined by using a 10% H$_3$PO$_4$ aqueous solution as follows: Capacitance: 209117 μFV/g, Leakage current: 0.55 nA/μFg.

EXAMPLE 15

An alloy powder was prepared as in Example 14, using an oxide powder with nominal composition of Nb:Ta=75:25 (weight ratio).

Analysis of the metal alloy powder gave a tantalum content of 26,74 wt.-% and the following impurity contents (ppm):

O: 15000, Mg: 25, C: 43, Fe: 9, Cr: 20, Ni: 2, Mo: 7, N: 247.

The primary grain size as determined visually was roughly 400 nm. BET specific surface was 3.9 m$^2$/g, Scott density 17.86 g/in$^3$, particle size (FSSS) was 2.95 μm, Hall Flow 27.0 s.

Anodes with a diameter of 2.99 mm, a length of 3.23 mm and a pressed density of 3.05 g/cm$^3$ were produced from the alloy powder by sintering on a niobium wire for 20 minutes at 1,150° C. Sintered density was 3.43 g/cm$^3$. The electrodes were anodized in an electrolyte containing 0.25% of H$_3$PO$_4$ until a final voltage of 40 V.

The capacitor characteristics were determined by using a 10% H$_3$PO$_4$ aqueous solution as follows: Capacitance: 290173 μFV/g, Leakage current: 0.44 nA/μFg.

EXAMPLE 16

Tantalum hydroxide was precipitated from an aqueous tantalum fluorocomplex solution by addition of ammonia. The precipitated hydroxide was calcined at 1100° C. for 4 hours to provide a Ta$_2$O$_5$ precursor with the following physical data: average particle diameter with Fisher Sub Sieve Sizer (FSSS): 7.3 μm, bulk density (Scott): 27.8 g/inch$^3$, specific surface area (BET): 0.36 m$^2$/g particle size distribution with laser diffraction on Master Sizer S, measured without ultrasound: D10=15.07 μm, D50=23.65 μm, D90=34.03 μm.

Figure 9A:
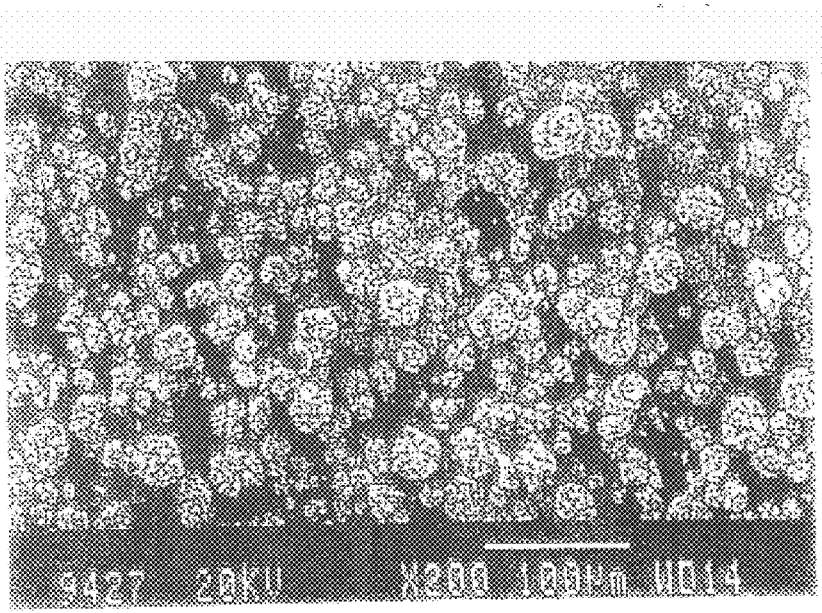
Figure 9B:
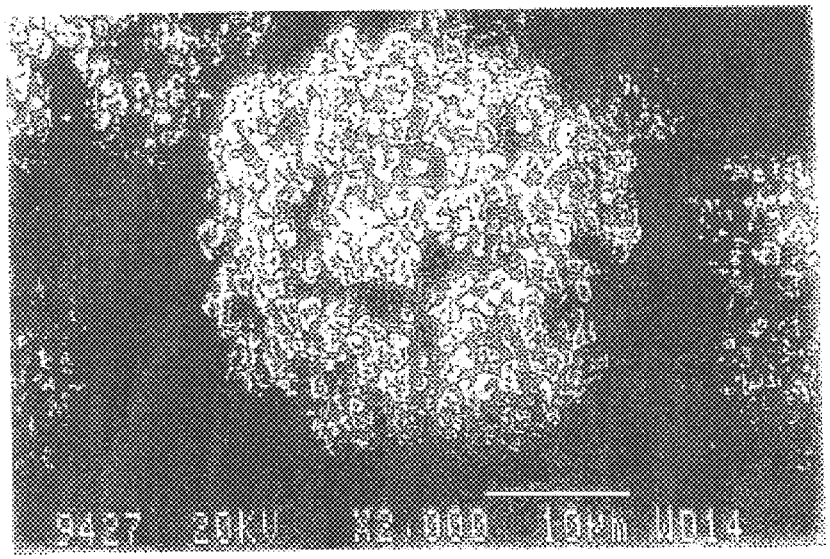
Figure 9C:
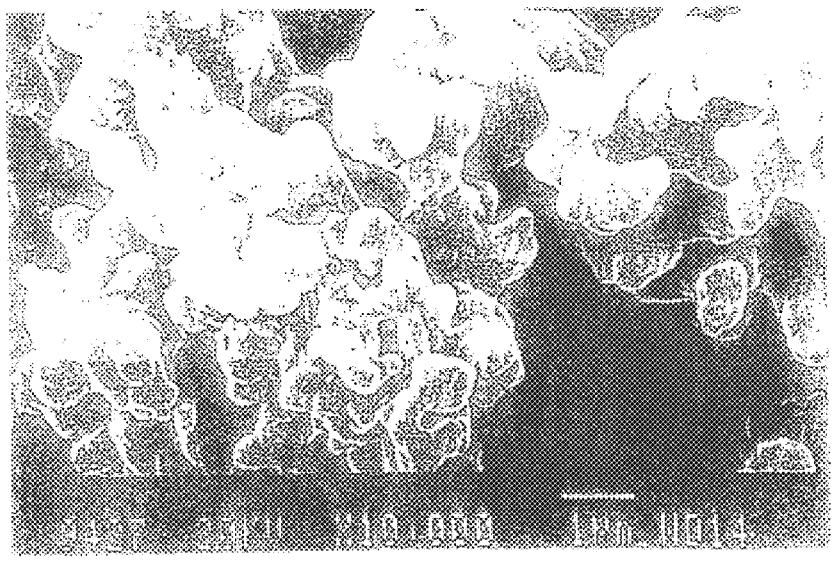

The morphology of agglomerated spheres is shown on FIGS. 9A–9C (SEM-pictures).

300 g of the precursor pentoxide was placed on the screen and 124 g Mg (1.5 times the stoichiometric amount necessary to reduce the pentoxide to metal) was placed on the bottom of a retort shown in FIG. 1.

The retort was evacuated, filled with argon and heated to 950° C. for 12 hours. After cooling to below 100° C., and passivation the product was leached with an aqueous solution containing 23 wt.-% sulfuric acid and 5.5 wt.-% hydrogen peroxide and thereafter washed with water until neutral. The product was dried over night at 50° C. and screened <400 μm.

Figure 10A:
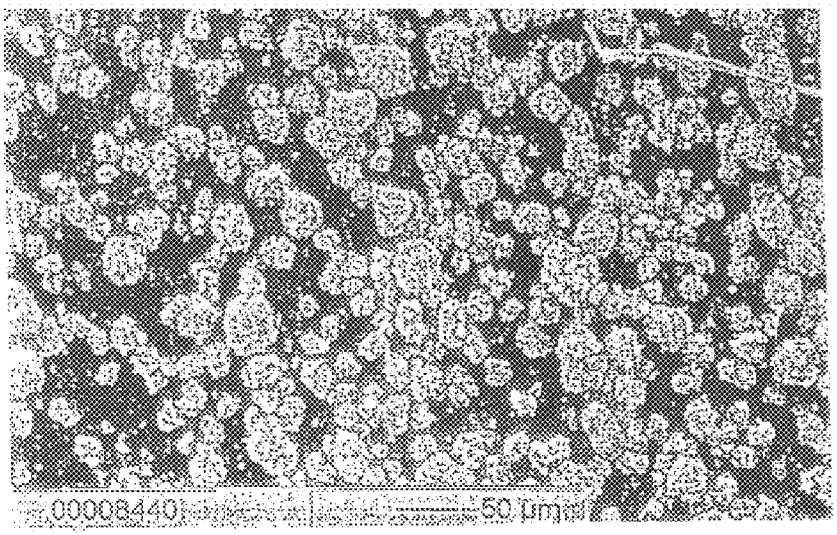
Figure 10B:
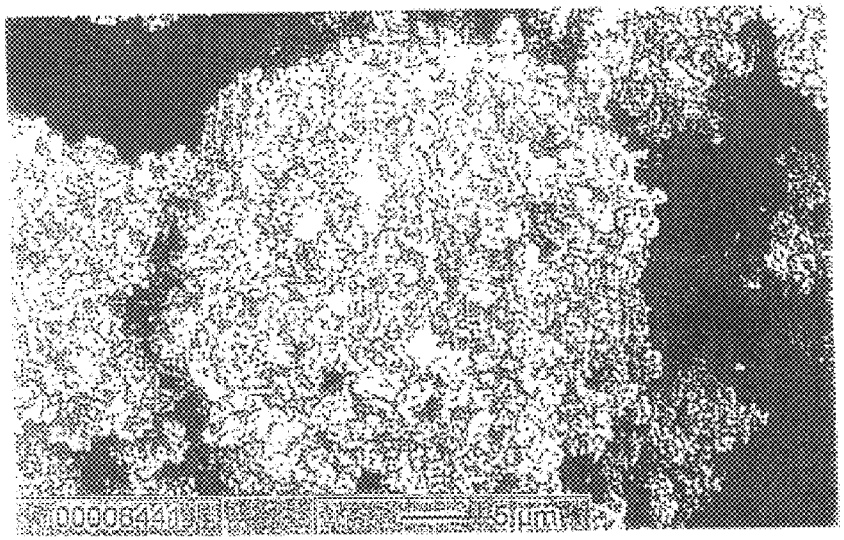
Figure 10C:
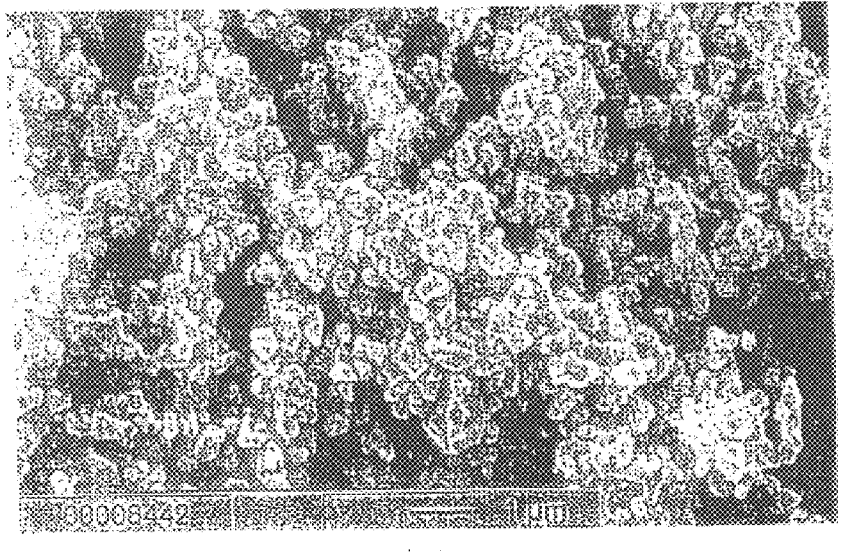

The tantalum powder showed the following analytical data:

Average particle size (FSSS): 1.21 μm, bulk density (Scott): 25.5 g/inch$^3$,

BET surface: 2,20 m$^2$/g, good flowability,

MasterSizer D10=12.38 μm, D50=21.47 μm, D90=32.38 μm, morphology: see FIGS. 10–10C (SEM-pictures).

Chemical analysis:

O: 7150 ppm

N: 488 ppm

H: 195 ppm

C: 50 ppm
Si: 30 ppm
F: 2 ppm
Mg: 6 ppm
Na: 1 ppm
Fe: 3 ppm
Cr: <2 ppm
Ni: <3 ppm.

The powder was soaked with gentle stirring with $NH_4H_2PO_4$-solution containing 1 mg P per ml, dried over night at 50° C. for doping with 150 ppm P and screened <400 μm.

Capacitor anodes were prepared from 0.047 g of Ta-powder each at pressed density of 5.0 g/cm³ by sintering at 1260° C. with 10 minutes holding time.

Forming current density was 150 mA/g with 0,1 wt.-% $H_3PO_4$ solution as forming electrolyte at 85° C. until final voltage of 16 V which was held for 100 minutes.
Test Results:
  Sintered density: 4.6 g/Cm³,
  capacitance: 100 577 μFV/g
  leakage current: 0.73 nA/μFV.

EXAMPLE 17

High purity optical grade $Ta_2O_5$ was calcined first at 1700° C. for 4 hours and thereafter for 16 hours at 900° C. to provide for more compact and coarser precursor particles. Physical properties of the pentoxide powder are:
  Average particle size (FSSS): 20 μm
  bulk density (Scott): 39 g/inch³

| Screen analysis: | | |
|---|---|---|
| | 400–500 μm | 8.7% |
| | 200–400 μm | 63.6% |
| | 125–200 μm | 15.0% |
| | 80–125 μm | 7.2% |
| | 45–80 μm | 3.8% |
| | <45 μm | 1.7% |

Figure 11A:
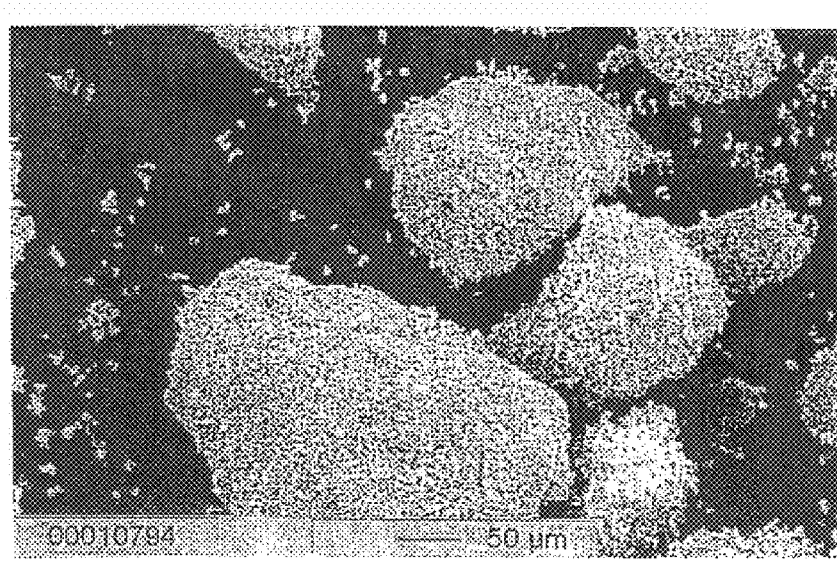
Figure 11B:
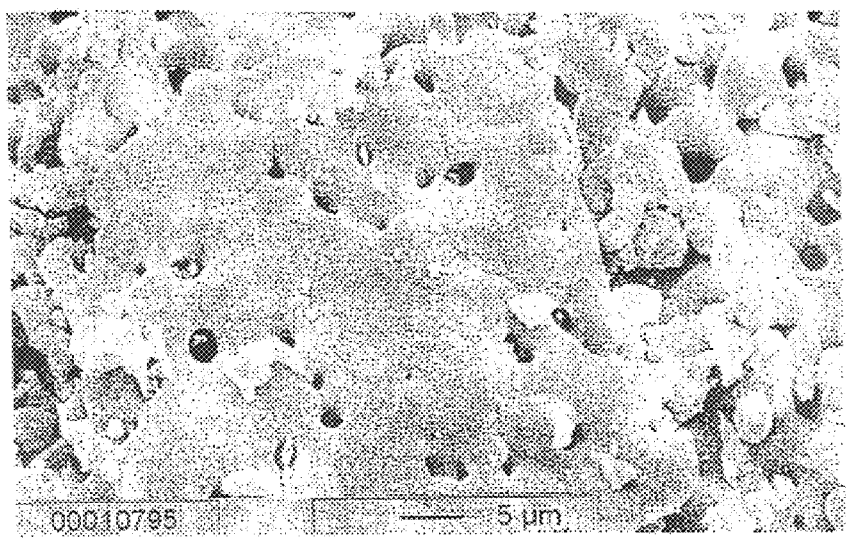
Figure 11C:
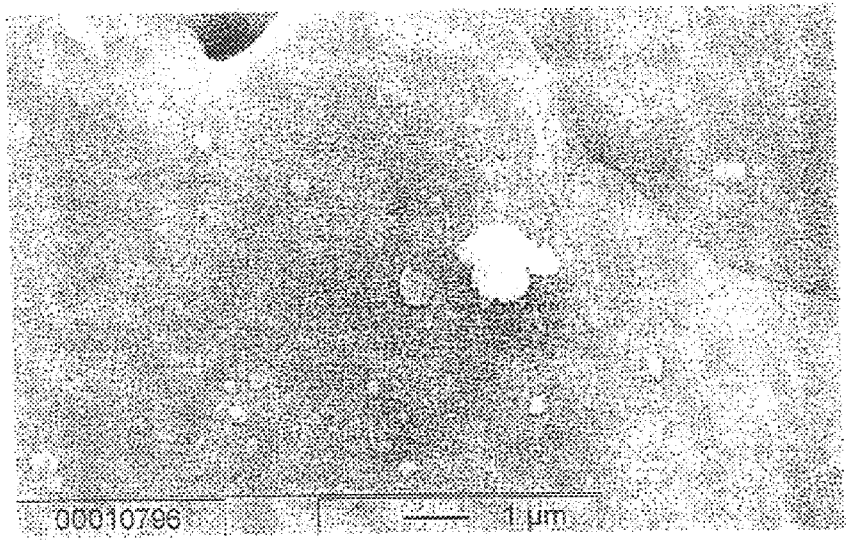

Morphology is shown in FIGS. 11A–11C (SEM-pictures).

The oxide powder was reduced to metal as described in example 16, however at 1000° C. for 6 hours.

Figure 12A:
Figure 12B:
Figure 12C:
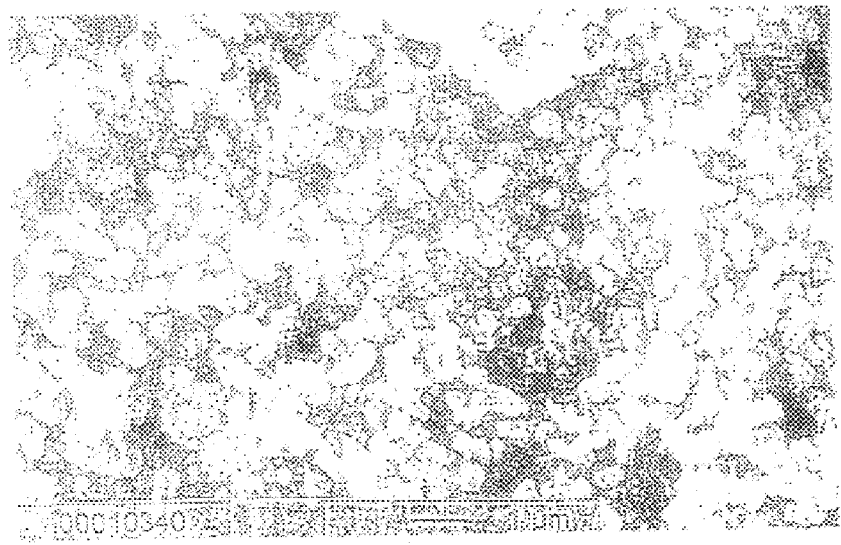

Leaching and P-doping was as in example 16.
The Tantalum Powder Showed the Following Analytical Data:
  Average particle size (FSSS): 2.8 μm,
  bulk density (Scott): 28.9 g/inch³,
  BET surface: 2.11 m²/g,
  flowability through nonvibrated funnel with 60°-angle and 0,1 inch opening: 25 g in 35 seconds,
  Master Sizer D10=103.29 μm, D50=294.63 μm, D90= 508.5 μm,
  morphology: see FIGS. 12A–12C (SEM-pictures).
Chemical Analysis:
  O: 7350 ppm
  N: 207 ppm
  H: 174 ppm
  C: 62 ppm
  Mg: 9 ppm
  Fe: 5 ppm
  Cr: <2 ppm
  Ni: <3 ppm.
  P: 150 ppm Capacitor anodes were prepared and anodized as in example 16.
Test Results:
  Sintered density: 4.8 g/cm³
  Capacitance: 89 201 μFV/g
  Leakage current: 0.49 nA/μFV A second series of capacitors were prepared the same way, however with sintering temperature raised to 1310° C.
Test Results:
  Sintered density: 5.1 g/cm³
  Capacitance: 84 201 μFV/g
  Leakage current: 0.68 nA/μFV

EXAMPLE 18

Several samples, each approximately 25 grams, of $WO_3$, $ZrO_2$, and $V_2O_3$ were reduced individually with gaseous magnesium at 950° C. for 6 hours. The reduction products were leached with dilute sulfuric acid to remove residual magnesium oxide. The product was a black metal powder in each case. The tungsten and zirconium powders had oxygen contents of 5.9 and 9.6 W/W % respectively, indicating that the metal oxides were reduced to the metallic state.

The present process appears to represent the only demonstrated way of making high quality chemically reduced niobium powder. The reduction of the metal oxide with a gaseous reacting agent, such as magnesium, as shown herein is thus particularly suitable for producing powders useable as metal-metal oxide capacitor substrates. Although the reduction process was carried out with the metal oxide in a bed in contact with a source of magnesium gas, the reduction can take place in a fluidized bed, rotary kiln, flash reactor, multiple hearth or similar systems provided the magnesium or other reducing agent is in the gaseous state. The process will also work with other metal oxides or metal oxide mixtures for which the reduction reaction with gaseous magnesium or other reducing agent has a negative Gibbs free energy change.

There are several advantages to the gaseous reduction processes described herein. Treatment of the reduction products is much less complicated and expensive than post reduction work-up of tantalum powder produced by liquid phase reactions such as the sodium reduction of $K_2TaF_7$ in a molten salt system. No fluoride or chloride residues are produced in the present process. This eliminates a potentially serious disposal problem or the need to institute an expensive waste recovery system. The reduction of metal oxides with gaseous reducing agents gives powders with much higher surface areas than powders produced by the molten salt/sodium reduction process. The new process easily makes powders with very high surface area compared to the traditional method; the potential for making very high performance capacitor grade powders is great with magnesium or other gaseous reducing agent.

The present invention further for the first time demonstrates the superiority of Ta-Nb alloy powders for use in the production of capacitors.

Figure 16:
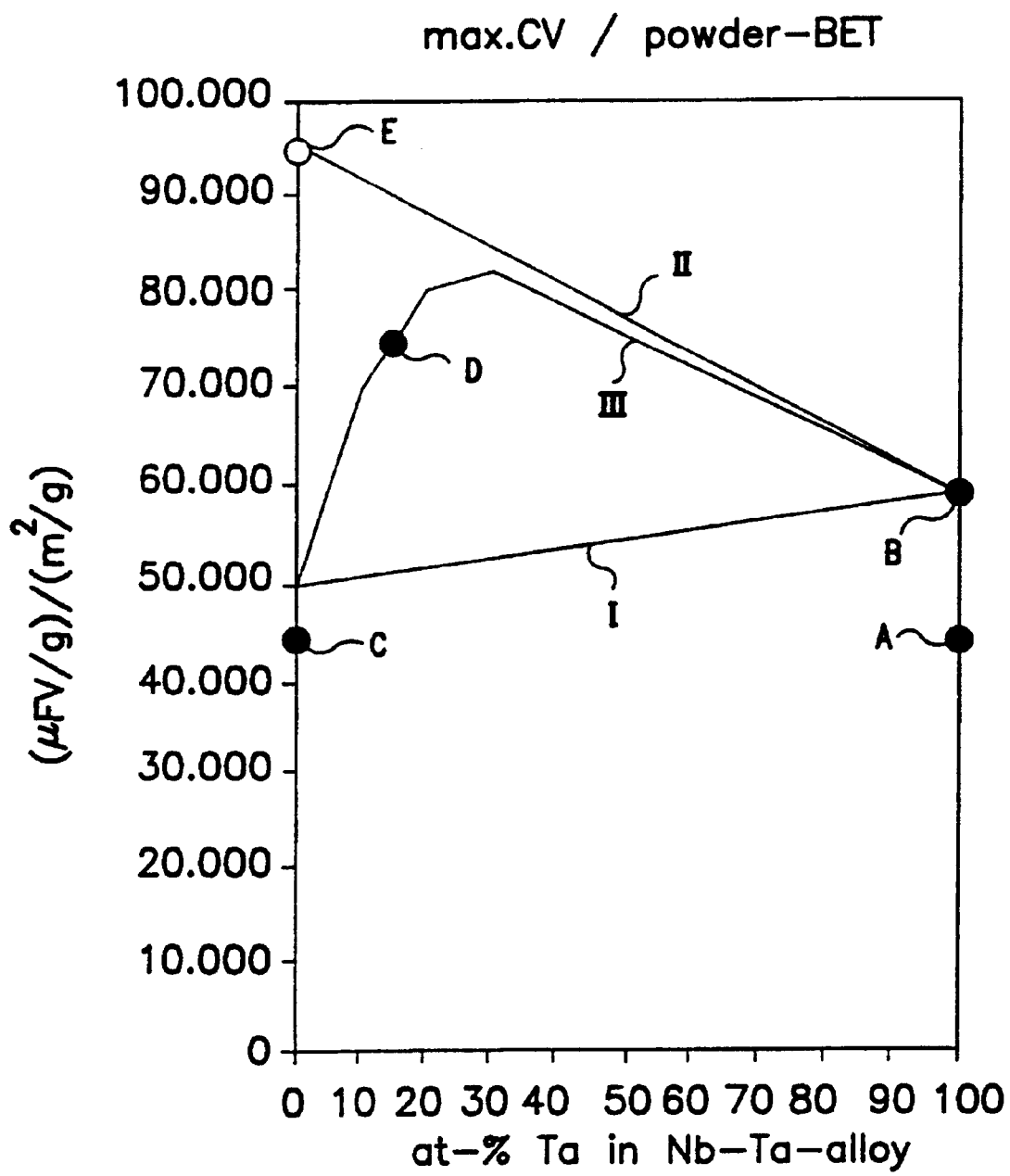
FIG. 16 is a trace of capacitance and surface area of Ta—Nb alloy powders in relation to alloy composition.

FIG. 16 shows the ratio of maximum obtainable capacitance (μFV/g) and BET-surface of powder (m²/g) in relation to the alloy composition. A and C represent pure Ta-, Nb-powders, respectively, as measured in present Example 16. B represents the highest known values of pure Ta powder capacitors as disclosed in Examples 2, 5 and 7 of WO 98/37249. Line 1 represents expectable values for alloy powder capacitors from linear interpolation from pure Ta, and Nb powder capacitors. E represents a fictive Nb-powder capacitor wherein the insulating oxide layer has the same thickness per volt as in Ta powder capacitors, however, the dielectric constant of niobium oxide differs. Line 11 represents linear interpolation between B and E. D represents a measured value of 25 wt.-% Ta/75 wt.-% Nb alloy powder capacitor as presented in present Example 15. Curve III represents the estimated dependency of capacitance on alloy composition of alloy powder capacitors in accordance with the present invention.

Figure 13:
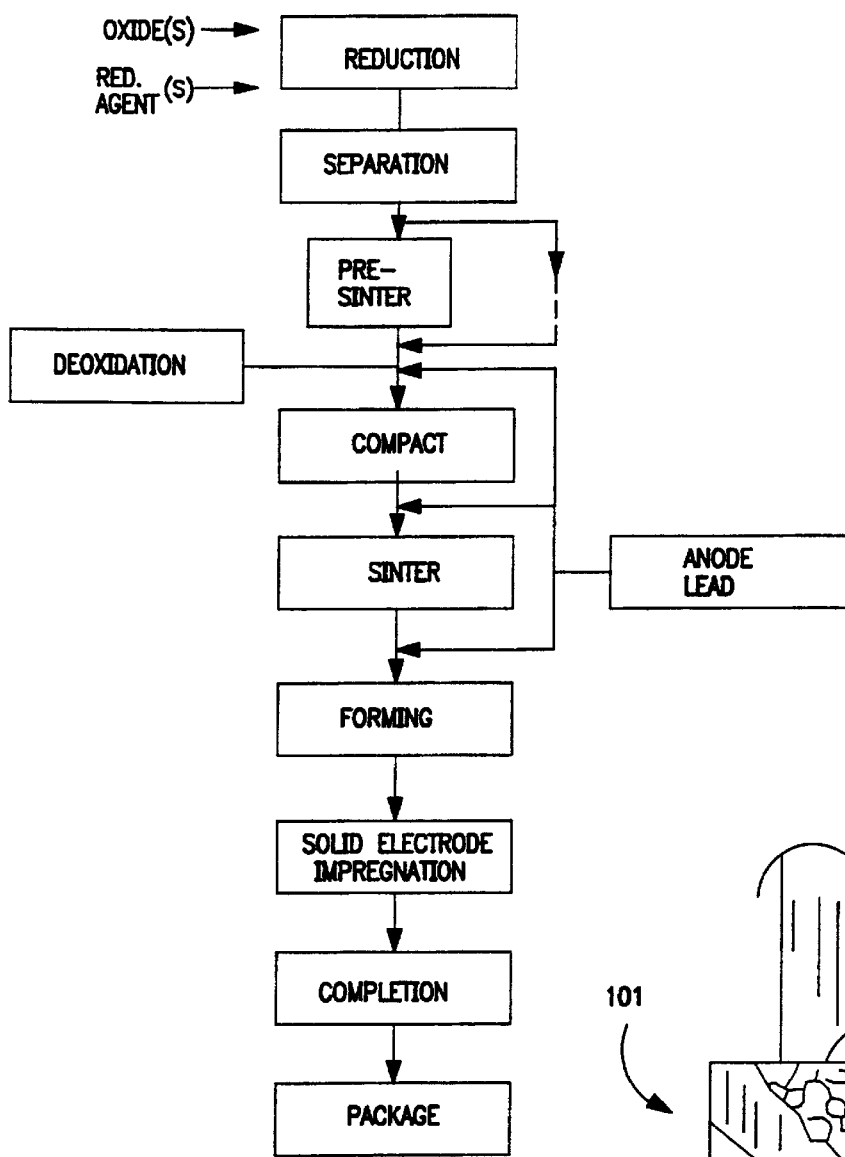
FIGS. 13 and 14 are flow charts illustrating diverse usages of the powder and derivatives.
Figure 15:
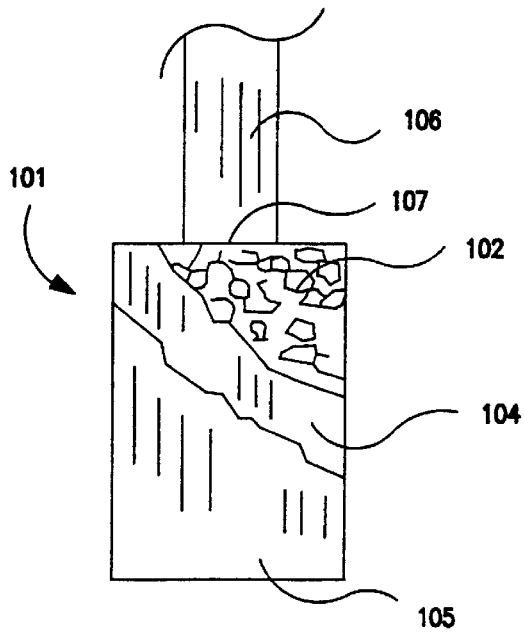
FIG. 15 is a schematic representation of an end item according to usage as a capacitor (one of several forms of capacitor usage).

FIG. 13 is a block diagram of steps for achieving an electrolytic capacitor usage of the invention. The steps comprise reduction of metal oxide with gaseous reducing agent; separation of reduction agent oxide from a mass of resultant metal; breakdown to powder form and/or primary powder particle size; classification; optionally, presinter to establish agglomerated secondary particles (controlled mechanical methods and control of original reduction or separation steps also being affective to establish agglomerates); deoxidation to reduce the oxygen concentration; compaction of primary or secondary particles to a porous coherent mass by cold isostatic pressing with or without use of compacting binders or lubricants; sintering to a porous anode form (which can be an elongated cylindrical, or slab or of a short length from such as a chip); anode lead attachment by embedding in the anode before sintering or welding to the sintered anode compact; forming the exposed metal surfaces within the porous anode by electrolytic oxidation to establish a dielectric oxide layer; solid electrode impregnation by impregnating precursors into the porous mass and pyrolysis in one or more stages or other methods of impregnation; cathode completion; and packaging. Various additional steps of cleaning and testing are not shown. The end product is illustrated (in a cylindrical form) in FIG. 15 as a Ta or Nb (or Ta—Nb—alloy) capacitor 101 in partial cut-away form as a porous Ta or Nb (or Ta—Nb alloy) anode 102, impregnated with a solid electrolyte, surrounded by a counter-electrode (cathode) 104 and packaging sheath 105 with a dense lead wire 106 of Ta or Nb (generally matching the powder composition) that is joined to the anode by a weld joint 107. As stated above, other known per se capacitor forms (different shape factors, different metals, different electrolyte systems anode lead joinder, etc.) are accessible through the present invention.

Figure 14:
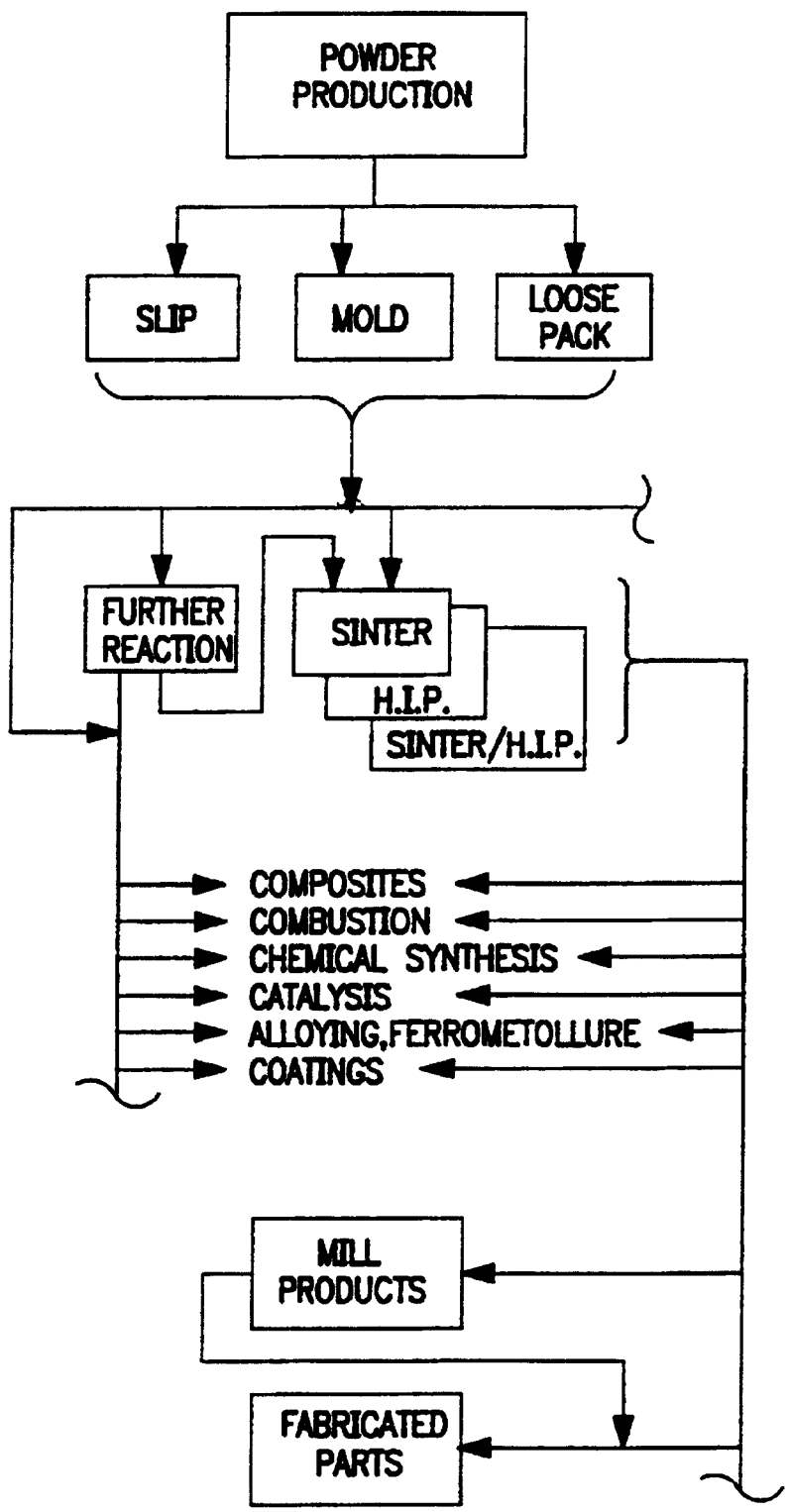

FIG. 14 is a block diagram collectively illustrating production of some of the other derivative products and uses of the invention including use of the powders as slips, in molding and loose pack form for further reaction and/or consolidation by way of sintering, hot isostatic pressing (H.I.P.) or in sinter/H.I.P. methods. The powders per se and/or as consolidated can be used in making composites, in combustion, in chemical synthesis (as reactants) or in catalysis, in alloying (e.g. ferrometallurgy) and in coatings. The consolidated powders can be used to make mill products and fabricated parts.

In some instances the end use products made using the gas reduction produced powders will resemble state of the art powders made with state of the art (e.g. reduced) powders and in other instances the products will be novel and have unique physical, chemical or electrical characteristics resulting from the unique forms as described herein of the powders produced by reduction by gaseous reducing agents. The processes of going from powder production to end product or end use are also modified to the extent the powders, and methods of producing the same, produce modified impurity profiles and morphology.

The mill products and fabricated parts manufacture can involve remelting, casting, annealing, dispersion strengthening and other well known per se artifacts. The end products made through further reaction of the metal powders can include high purity oxides, nitrides, silicides and still further derivatives such as complex ceramics used in ferroelectrics and in optical applications, e.g. perovskite structure PMW compounds.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Niobium powder in the form of agglomerated primary particles with a particle size of 100 to 1000 nm, wherein the agglomerates have a particle size corresponding to D10=3 to 80 μm, D50=20 to 250 μm and D90 30 to 400 μm as determined by Mastersizer.

2. Niobium powder according to claim 1, containing up to 40 at.-% of Ta alone or with one or more of at least one metal selected from the group of Ti, Mo, W, Hf, V and Zr, based on the total metal content.

3. Niobium powder according to claim 2, containing at least 2 at.-% of the other metal(s).

4. Niobium powder according to claim 2, containing at least 3.5 at.-% of the other metal(s).

5. Niobium powder according to claim 2, containing at least 5 at.-% of the other metal(s).

6. Niobium powder according to claim 2, containing at least 10 at.-% of the other metal(s).

7. Niobium powder according to claim 2, containing up to 34 at.-% of the other metal(s).

8. Niobium powder according to one of claim 2, containing tantalum as the other metal.

9. The powder according to claim 1, wherein the powder is in the form of agglomerated substantially spherical primary particles having a diameter ranging from 100 to 1500 nm.

10. The powder according to claim 1, wherein the powder has a BET-surface value and an alloy density value and the multiplication product of the BET-surface value and the alloy density value ranges from 8 to 250 $(m^2/g) \times (g/cm^3)$.

11. The powder according to claim 1, wherein the powder has an agglomerate particle size ranging from 20 to 300μ as determined as D50-value according to Mastersizer.

12. The powder according to claim 1, wherein the powder contains (i) oxygen in an amount ranging from 2500 to 4500 ppm/$m^2$, (ii) up to 10,000 ppm nitrogen, (iii) up to 150 ppm, carbon, and (iv) less than a total of 500 ppm impurity metals.

13. Niobium powder according to either of claim 1 or 2, which after sintering at 1100° C. and forming at 40 V exhibit a specific capacitor capacitance of 80,000 to 250,000 μFV/g and a specific leakage current density of less than 2 nA/μFV.

14. An alloy powder for use in the manufacture of electrolyte capacitors consisting essentially of niobium and containing up to 40 at.-% of tantalum based on the total content of Nb and Ta.

15. The powder according to claim 14, containing at least 2 at.-% of tantalum.

16. The powder according to claim 15, containing at least 3.5 at.-% of tantalum.

17. The powder according to claim 15, containing at least 5 at.-% of tantalum.

18. The powder according to claim 15, containing at least 10 at.-% of tantalum.

19. The powder according to claim 14, containing from 12 to 34 at.-% of tantalum.

20. The powder according to claim 14, wherein the powder is in the form of agglomerated substantially spherical primary particles having a diameter ranging from 100 to 1500 nm, wherein the primary particles have a BET surface value and a density value, and wherein the multiplication product of the BET surface value and the density value ranges from 15 to 60 $(m^2/g) \times (g/cm^3)$.

21. The powder according to claim 14, wherein the powder has a mean particle size D50-value according to Mastersizer ranging from 20 to 250 $\mu$m.

22. A capacitor anode obtained by sintering of a powder in accordance with claim 14, and anodization.

23. A capacitor comprising an anode according to claim 22.

24. A process for the manufacture of alloy powder according to claim 14, comprising the steps of
   (a) Hydriding an electron-beam melted alloy ingot containing Nb and up to 40 at.-% Ta based on the total content of Nb and Ta, and
   (b) Comminuting said hydrided alloy ingot, and
   (c) Dehydriding the comminuted alloy obtained from step (b), and
   (d) Forming said comminuted alloy into flakes, and
   (e) Agglomerating said flakes at a temperature of 800 to 1150° C. in the presence of an alkali earth metal as a reducing agent, and
   (f) Leaching and washing the agglomerated alloy flakes to remove any residual and residual product of the reducing agent.

25. The process according to claim 24, wherein during the agglomeration step the alloy powder is doped with phosphorous and/or nitrogen.

26. A process for making a metal powder selected from the group consisting of Ta, Nb, Ta alloys, Nb alloys, and combinations thereof, alone or with one or more of metals selected from the group consisting of Ti, Mo, W, Hf and V and Zr,
   wherein the process comprises:
       (a) providing an oxide or mixed oxides of the metal(s), wherein the oxide or the mixed oxides are in a form that is traversable by gas,
       (b) passing a hydrogen-containing gas through an oxide mass at an elevated temperature at a first stage and removing at least 20% of the oxygen contained in the oxide mass, thereby reducing the oxide or mixed oxides to a suboxide, and
       (c) reducing the suboxide in a second stage with a reducing agent selected from the group of reducing metals and hydrides of reducing metals, and thereby freeing metal from the suboxide and forming a primary metal powder.

27. The process of claim 26, wherein in step (c), the suboxide is substantially or completely reduced.

28. The process according to claim 26, wherein the reducing agent is selected from the group consisting of Mg, Ca, Al, Li, Ba, Sr, hydrides of Mg, Ca, Al, Li, Ba, Sr, and combinations thereof.

29. The process according to claim 26, wherein the primary metal powder is processed to an agglomerated secondary form.

30. The process according to claim 29, wherein a deoxidation step is applied to the agglomerated secondary form of the powder.

31. The process according to claim 26, wherein the process further comprises subjecting the primary metal powder to deoxidization by exposing the powder to a gaseous reducing agent.

32. The process according to claim 26, wherein the first stage is carried out until the volume of solid matter is reduced by at least 35 to 50%.

33. The process according to claim 26, wherein the reduction in the first stage is conducted with $MeO_x$, wherein Me denotes Ta and/or Nb and x assumes a value of 1 to 2.

34. The process according to claim 26, wherein the reduction product from the first stage is maintained at approximately the reduction temperature for a further 60 to 360 minutes.

35. The process according to claim 26, wherein Mg, Ca and/or hydrides thereof are used as reducing agents in the second stage.

36. The process according to claim 26, wherein the metal comprises tantalum and the oxide comprises tantalum pentoxide.

37. The process according to claim 26, wherein the metal comprises niobium and the oxide comprises niobium pentoxide or a niobium suboxide.

38. The process according to claim 26, wherein the oxide contains tantalum in an amount of up to 50 atomic % based on the total content of metals.

39. The process according to claim 26, wherein the form of the oxide mass traversable by gas provides a void volume of at least 90%.

40. The process according to claim 26, wherein the oxide is provided in the form of agglomerated primary oxide particles with diameters from 100 to 1000 nm and an average agglomerate size ranging from 10 to 1000 $\mu$m.

41. The process according to claim 26, wherein the reducing agent is magnesium.

42. The process according to claim 26, wherein the elevated temperature during passing the gaseous reducing agent through the oxide mass is below 0.5, the melting point of metal powder.

43. The process according to claim 26, wherein the temperature is below 0.4, the melting point of the primary metal powder.

44. The process according to claim 26, wherein the primary metal powder is subjected to a further deoxidation treatment to produce a finished metal product.

45. The process according to claim 26, wherein one or more finishing deoxidation steps are provided as an extension of the reduction reaction.

46. The process according to claim 26, wherein the finishing deoxidation step is a separate treatment.

47. The process according to claim 26, wherein the metal powder is further formed into a coherent porous mass.

48. A single-stage process for making a metal powder selected from the group consisting of Ta and Nb, and one or more metals selected from the group consisting of Ti, Mo, W, Hf, V and Zr,
   the process comprising:
       (a) providing an oxide or mixed oxides of the metal(s), wherein the oxide or the mixed oxides are in a form that is traversable by gas,
       (b) generating a gaseous reducing agent at a site outside an oxide mass and passing the gas through the mass at a first temperature, and
       (c) reducing of the oxide(s) at a second temperature and freeing metal portion from the oxide, wherein the first temperature is the same or less than the second temperature.

49. The process of claim 48, wherein the oxide in step (c) is substantially or completely reduced.

50. The process of claim 48, wherein the process avoids using a molten or a solid reducing agent.

51. The process of claim 48, wherein residual oxide of reducing agent formed in the reaction is easily removed.

52. The process of claim 48, wherein a high surface area powder is formed in a process that essentially avoids use of molten state reducing agent in production of metal or alloy powder.

53. A capacitor anode comprising a sintered niobium powder agglomerated primary particles with a particle size ranging from 100 to 1000 nm, wherein the agglomerated primary particles have a particle size ranging from D10=3 to 80 μm, D50=20 to 250 μm and D90 30 to 400 μm as determined by Mastersizer.

54. The capacitor anode of claim 53, wherein the anode is made by a process comprising (i) sintering a powder in the form of agglomerated primary particles with a particle size of 100 to 1000 nm, wherein the agglomerates have a particle size corresponding to D10=3 to 80 μm, D50=20 to 250 μm and D90 30 to 400 μm as determined by Mastersizer and (ii) subjecting the powder to anodization.

55. A capacitor comprising an anode according to claim 53.

56. The capacitor according to claim 53, wherein the capacitor is a solid electrolyte capacitor.

57. An alloy powder for use in the manufacture of electrolyte capacitors comprising niobium and containing up to 40 atomic % of tantalum based on the total content of Nb and Ta.

58. The powder according to claim 57, wherein the powder contains at least 2 atomic % of tantalum.

59. The powder according to claim 57, wherein the powder contains at least 3.5 atomic % of tantalum.

60. The powder according to claim 57, wherein the powder contains at least 5 atomic % of tantalum.

61. The powder according to claim 57, wherein the powder contains at least 10 atomic % of tantalum.

62. The powder according to claim 57, wherein the powder contains from 12 to 34 atomic % of tantalum.

63. The powder according to claim 57, wherein the powder is in the form of agglomerated substantially spherical primary particles having a diameter of 100 to 1500 nm, the powder has a BET surface value and a density value and the multiplication product of the BET surface and the density ranges from 15 to 60 $(m^2/g) \times (g/cm^3)$.

64. The powder according to claim 57, wherein the powder has a mean particle size D50-value according to Mastersizer of 20 to 250 μm.

65. A process for the manufacture of alloy powder for use in the manufacture of electrolyte capacitors comprising niobium and containing up to 40 atomic % of tantalum based on total content of Nb and Ta comprising:
   (a) hydriding an electron-beam melted alloy ingot containing Nb and up to 40 atomic % Ta based on the total content of Nb and Ta,
   (b) comminuting said hydrided alloy ingot,
   (c) dehydriding the comminuted alloy obtained from step (b), and
   (d) forming said comminuted alloy into flakes,
   (e) agglomerating said flakes at a temperature of 880 to 1150° C. in the presence of an alkali earth metal as a reducing agent, and
   (f) leaching and washing the agglomerated alloy flakes to remove any residual and residual product of the reducing agent.

66. The process according to claim 65, wherein during the agglomeration step the alloy powder is doped with phosphorous and/or nitrogen.

* * * * *